(12) United States Patent
Wilhelm et al.

(10) Patent No.: US 9,506,590 B2
(45) Date of Patent: Nov. 29, 2016

(54) COUPLING FOR FLUID BLADDER

(71) Applicant: Colder Products Company, Saint Paul, MN (US)

(72) Inventors: Grant Armin Wilhelm, Plymouth, MN (US); Dennis Daniel Downs, Andover, MN (US); Mark F. Schmidt, Forest Lake, MN (US)

(73) Assignee: Colder Products Company, Saint Paul, MN (US)

( * ) Notice: Subject to any disclaimer, the term of this patent is extended or adjusted under 35 U.S.C. 154(b) by 185 days.

(21) Appl. No.: 13/774,296

(22) Filed: Feb. 22, 2013

(65) Prior Publication Data

US 2014/0060675 A1    Mar. 6, 2014

Related U.S. Application Data

(60) Provisional application No. 61/602,728, filed on Feb. 24, 2012.

(51) Int. Cl.
| | |
|---|---|
| *F16L 37/084* | (2006.01) |
| *A45F 3/20* | (2006.01) |
| *A45F 3/00* | (2006.01) |
| *B67D 1/08* | (2006.01) |
| *F16L 37/14* | (2006.01) |
| *F16L 37/413* | (2006.01) |
| *B29C 45/16* | (2006.01) |
| *A45F 3/16* | (2006.01) |

(52) U.S. Cl.
CPC .............. *F16L 37/0841* (2013.01); *A45F 3/00* (2013.01); *A45F 3/20* (2013.01); *B67D 1/0801* (2013.01); *F16L 37/142* (2013.01); *F16L 37/413* (2013.01); *A45F 2003/166* (2013.01); *B29C 45/16* (2013.01); *Y10T 137/8593* (2015.04)

(58) Field of Classification Search
CPC ............................. F16L 37/0841; A45F 3/20
USPC ................. 251/149.6, 149.8, 149.9, 152
See application file for complete search history.

(56) References Cited

U.S. PATENT DOCUMENTS

| | | | | |
|---|---|---|---|---|
| 4,436,125 | A | * | 3/1984 | Blenkush ..................... 141/330 |
| 4,541,457 | A | * | 9/1985 | Blenkush ................. 137/614.06 |
| 4,613,112 | A | * | 9/1986 | Phlipot et al. ............. 251/149.6 |
| 5,052,725 | A | * | 10/1991 | Meyer et al. ................. 285/308 |

(Continued)

OTHER PUBLICATIONS

International Search Report and Written Opinion in PCT/US2013/027418, dated Aug. 28, 2013, 9 pages.

(Continued)

*Primary Examiner* — Kevin Murphy
*Assistant Examiner* — David Colon Morales
(74) *Attorney, Agent, or Firm* — Merchant & Gould P.C.

(57) ABSTRACT

A coupler for a fluid system includes: a coupling device made of an inflexible polymeric material, the coupling device including a body defining a fluid passage therethrough that is connected to an aperture sized to receive a mating coupling device, the coupling device including a latch configured to move between an uncoupled state and a coupled state to couple the mating coupling device thereto; and a base made of a flexible polymeric material, the base including a flange member sized to be coupled to a bladder of the fluid hydration system, and the base including a receiving member sized to receive at least a portion of the coupling device. The base is overmolded over the coupling device to form the coupler, the coupler being fluid-tight.

8 Claims, 32 Drawing Sheets

(56) References Cited

U.S. PATENT DOCUMENTS

| | | | |
|---|---|---|---|
| 5,104,158 | A | 4/1992 | Meyer et al. |
| 5,316,041 | A * | 5/1994 | Ramacier, Jr. ...... F16L 37/0841 137/614.04 |
| 5,607,087 | A * | 3/1997 | Wery et al. .................. 222/610 |
| 5,727,714 | A * | 3/1998 | Fawcett ........................ 222/175 |
| 5,806,832 | A * | 9/1998 | Larbuisson ................ 251/149.6 |
| 5,845,943 | A * | 12/1998 | Ramacier et al. .............. 285/12 |
| 5,938,244 | A * | 8/1999 | Meyer .......................... 285/305 |
| 5,975,489 | A * | 11/1999 | deCler et al. ............... 251/149.1 |
| 6,231,089 | B1 * | 5/2001 | DeCler et al. ................ 285/308 |
| 6,520,480 | B2 * | 2/2003 | Martin-Cocher ....... F16L 37/38 251/149.1 |
| 6,675,998 | B2 * | 1/2004 | Forsman ................ B65D 77/28 215/306 |
| 6,758,457 | B2 * | 7/2004 | Nicolino et al. ........... 251/149.6 |
| 7,073,688 | B2 * | 7/2006 | Choi et al. .................. 222/175 |
| 7,153,296 | B2 * | 12/2006 | Mitchell ............... A61M 39/10 251/149.9 |
| 7,600,656 | B2 * | 10/2009 | Karl ......................... A45F 3/18 222/175 |
| 7,806,300 | B1 * | 10/2010 | Noell et al. ................... 222/175 |
| 2002/0170731 | A1 * | 11/2002 | Garber ................. B67D 7/348 174/47 |
| 2004/0238571 | A1 | 12/2004 | Noell et al. |
| 2005/0001425 | A1 * | 1/2005 | deCler et al. ................ 285/305 |
| 2005/0012330 | A1 * | 1/2005 | Schmidt ....................... 285/317 |
| 2007/0108158 | A1 * | 5/2007 | Stribling et al. .............. 215/389 |
| 2007/0209716 | A1 * | 9/2007 | Rankin ......................... 137/554 |

OTHER PUBLICATIONS

CamelBak Reservoirs and accessories, admitted prior art as of the earliest priority date of the present patent application, 5 pages.
Hydrapak Hydration Packs and components, admitted prior art as of the earliest priority date of the present patent application, 15 pages.

* cited by examiner

COUPLING FOR FLUID BLADDER

BACKGROUND

Bladders can be filled with fluids and dispensed at desired intervals. For example, in one implementation, a hydration system includes a bladder that can be filled with a fluid, such as water. The bladder includes a coupler that allows a conduit to be attached to the bladder. The conduit, in turn, can be routed for easy access for an individual that is hiking, biking, etc. At various intervals, the individual can access the fluid in the bladder through the conduit. In some implementations, the conduit can be uncoupled from the bladder for ease in refilling, cleaning, and storage.

SUMMARY

In one aspect, a coupler for a fluid hydration system includes: a coupling device made of an inflexible polymeric material, the coupling device including a body defining a fluid passage therethrough that is connected to an aperture sized to receive a mating coupling device, the coupling device including a latch configured to move between an uncoupled state and a coupled state to couple the mating coupling device thereto; and a base made of a flexible polymeric material, the base including a flange member sized to be coupled to a bladder of the fluid hydration system, and the base including a receiving member sized to receive at least a portion of the coupling device; wherein the base is overmolded over the coupling device to form the coupler, the coupler being fluid-tight.

In another aspect, a fluid hydration system includes: a bladder defining an interior space sized to receive a fluid; and a coupler, including: a coupling device made of an inflexible polymeric material, the coupling device including a body defining a fluid passage therethrough that is connected to an aperture sized to receive a mating coupling device, the coupling device including a latch configured to move between an uncoupled state and a coupled state to couple the mating coupling device thereto; and a base made of a flexible polymeric material, the base including a flange member sized to be coupled to the bladder, and the base including a receiving member sized to receive at least a portion of the coupling device; wherein the base is overmolded over the coupling device to form the coupler, the coupler being fluid-tight.

In yet another aspect, a fluid system includes: a bladder defining an interior space sized to receive a fluid; and a coupler, including: a coupling device made of an inflexible polymeric material, the coupling device including a body defining a fluid passage therethrough that is connected to an aperture sized to receive a mating coupling device, the coupling device including a latch configured to move between an uncoupled state and a coupled state to couple the mating coupling device thereto; a base made of a flexible polymeric material, the base including a flange member sized to be coupled to the bladder, and the base including a receiving member sized to receive at least a portion of the coupling device; and a valve member including a seal member that seals against a surface of the coupling device; wherein the base is overmolded over the coupling device to form the coupler, the coupler being fluid-tight; and wherein the valve member is inserted into a front opening of the coupling device during assembly of the coupler.

DETAILED DESCRIPTION

The present disclosure is directed towards a coupler for a bladder. In example embodiments, the bladder is part of a hydration system, and the coupler allows a conduit to be releasably connected to the bladder.

Figure 1:
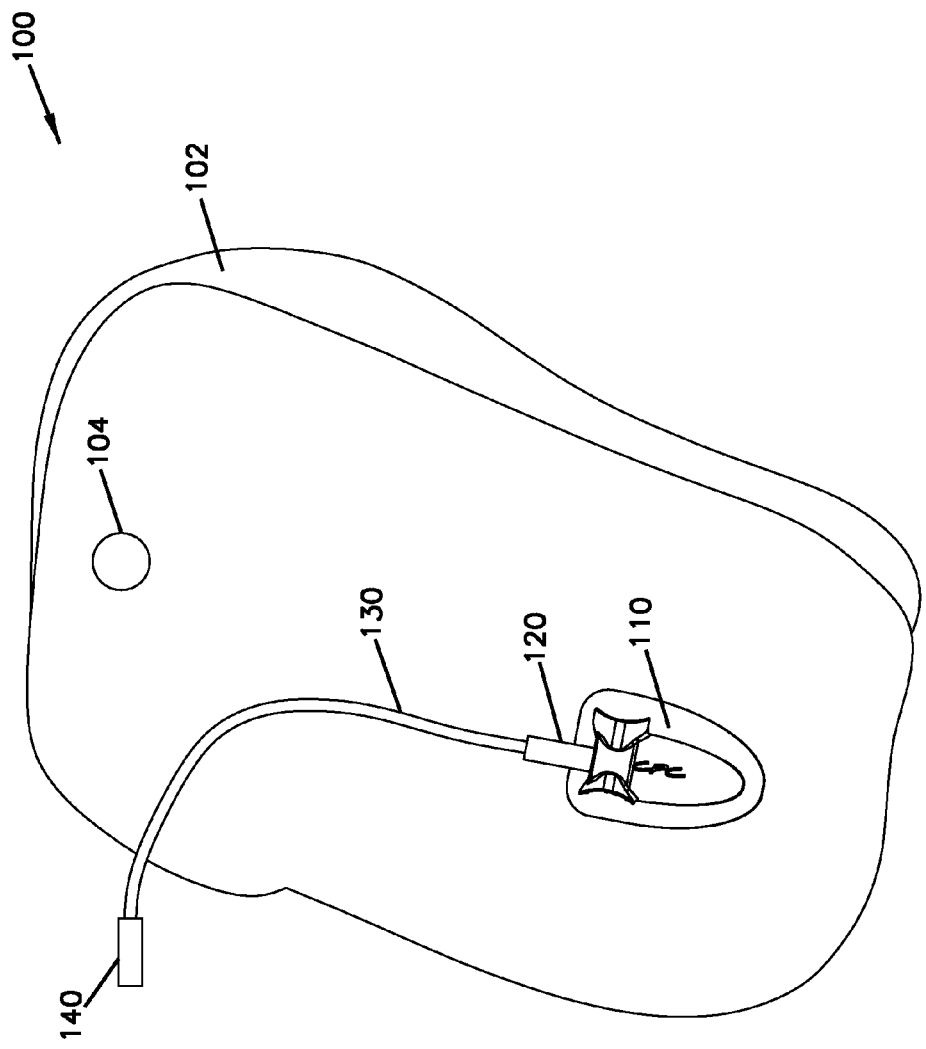
FIG. 1 shows a perspective view of an example hydration system.
Figure 2:
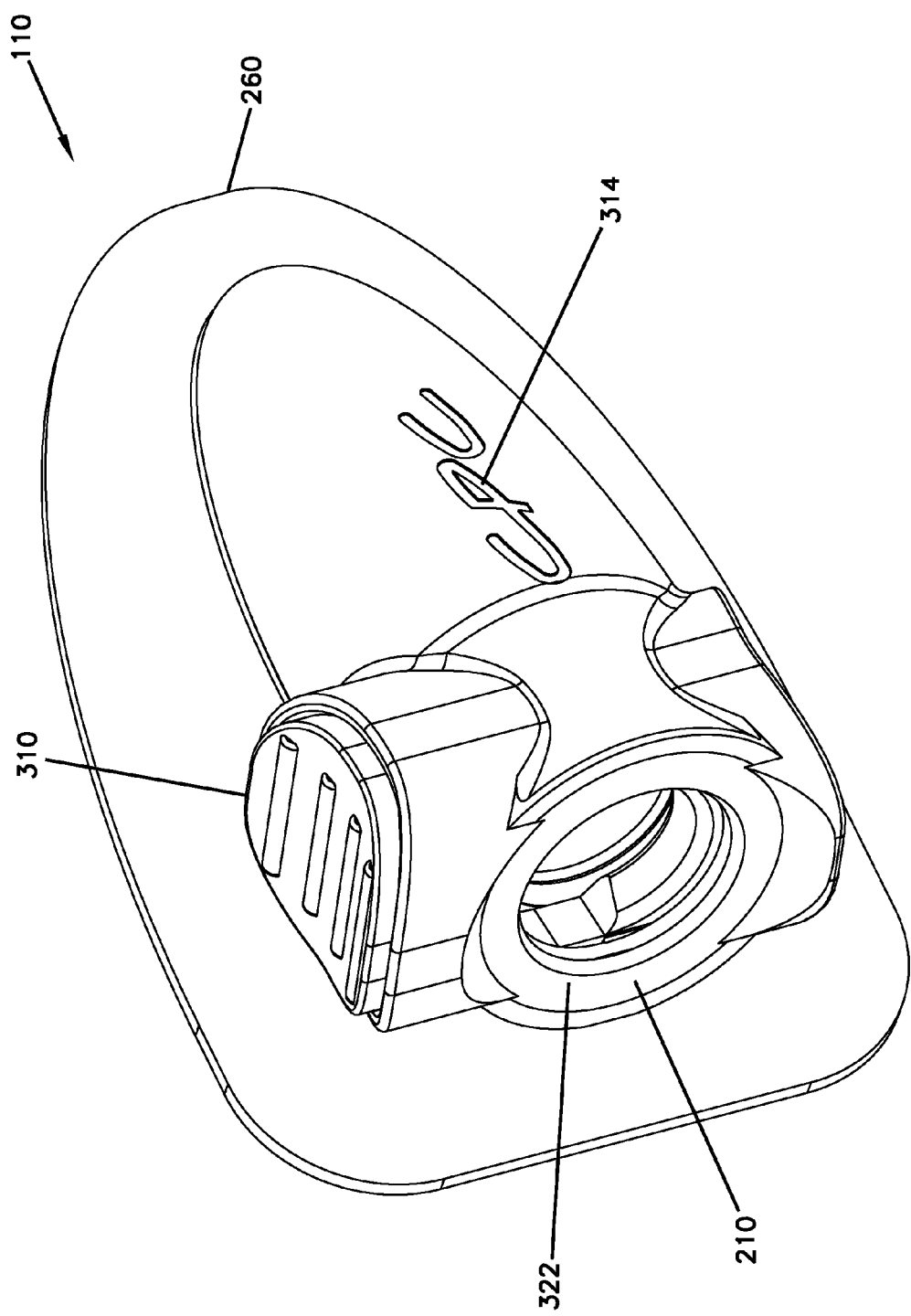
FIG. 2 shows a perspective view of an example coupler of the hydration system of FIG. 1.
Figure 3:
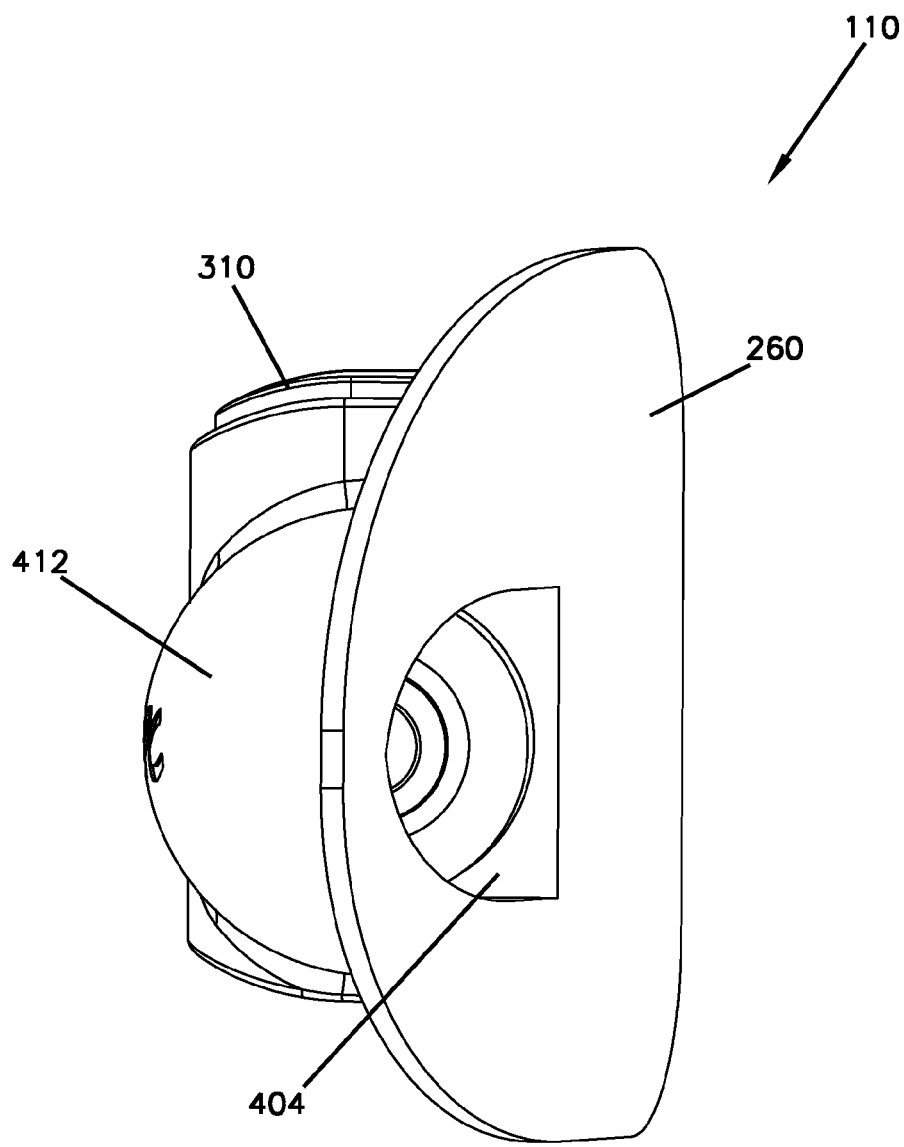
FIG. 3 shows an end view of the coupler of FIG. 2.
Figure 4:
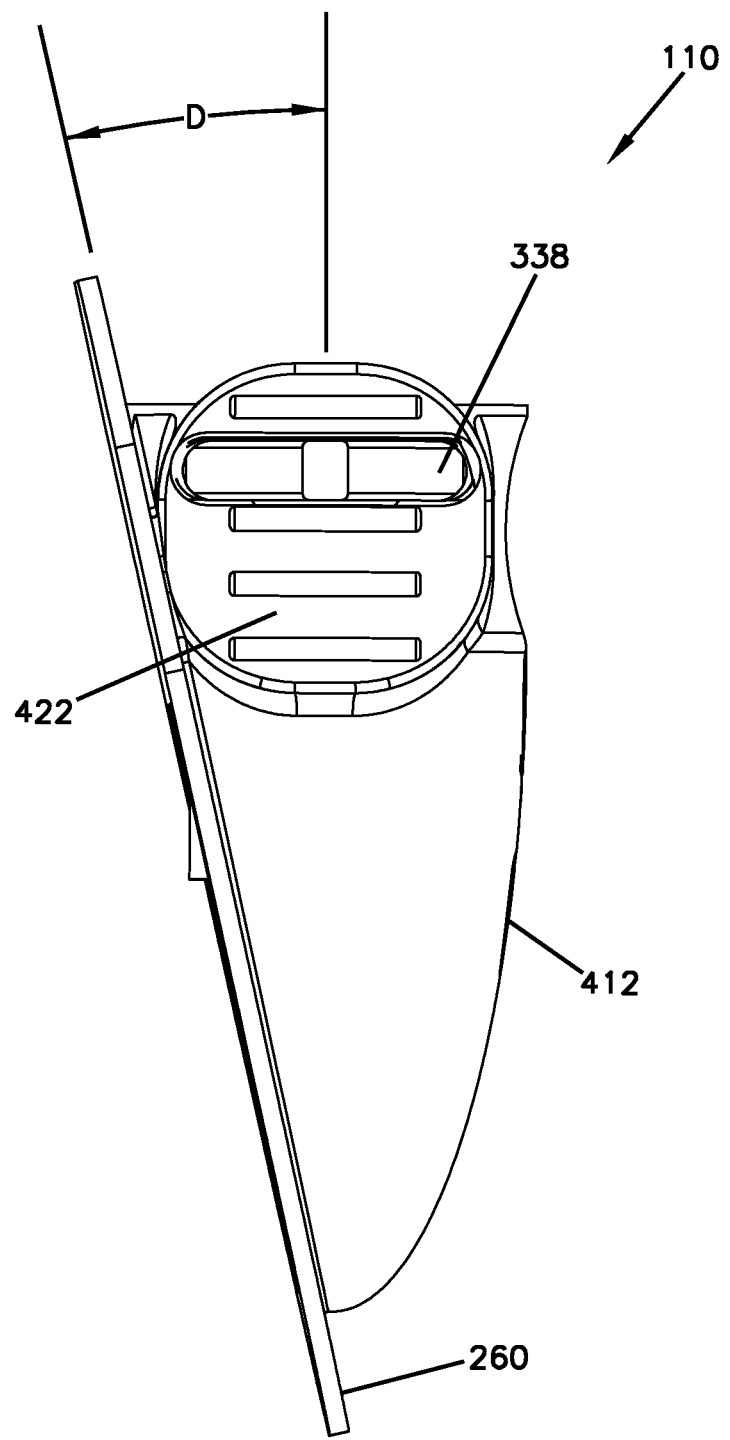
FIG. 4 shows a side view of the coupler of FIG. 2.
Figure 5:
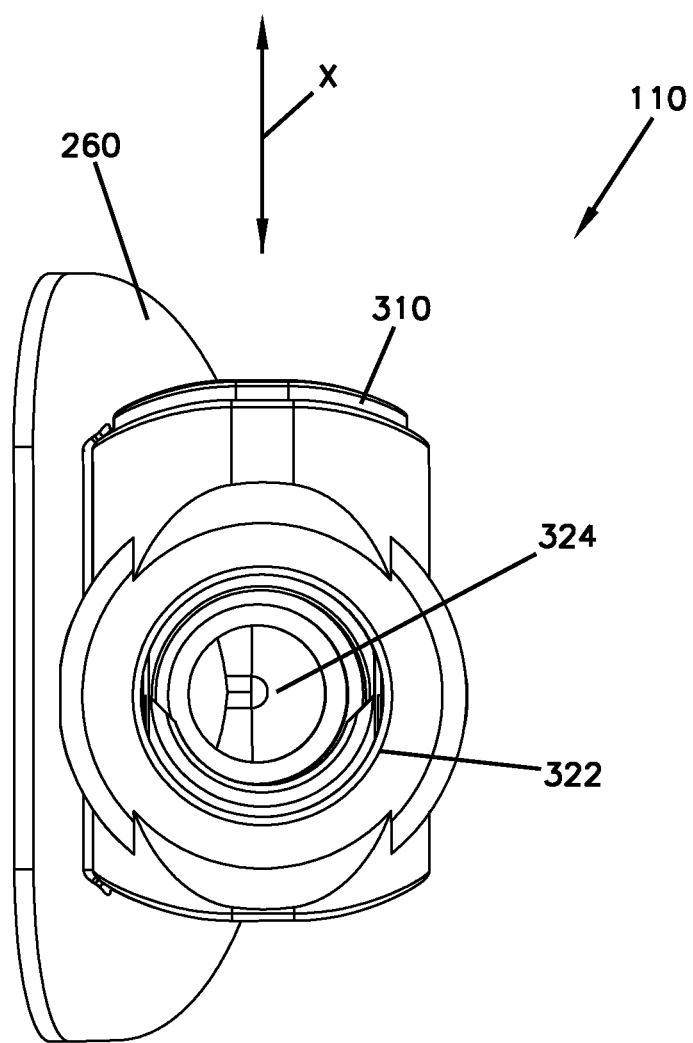
FIG. 5 shows another end view of the coupler of FIG. 2.
Figure 6:
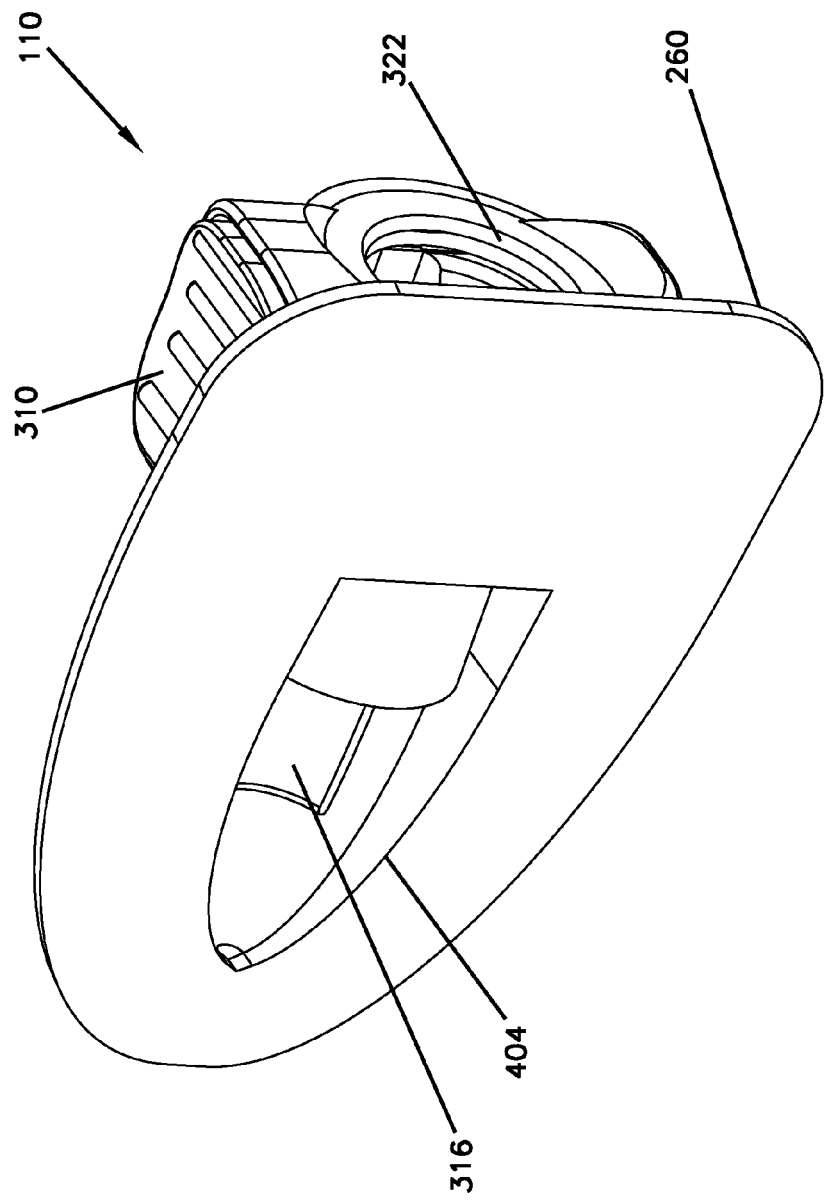
FIG. 6 shows another perspective view of the coupler of FIG. 2.
Figure 7:
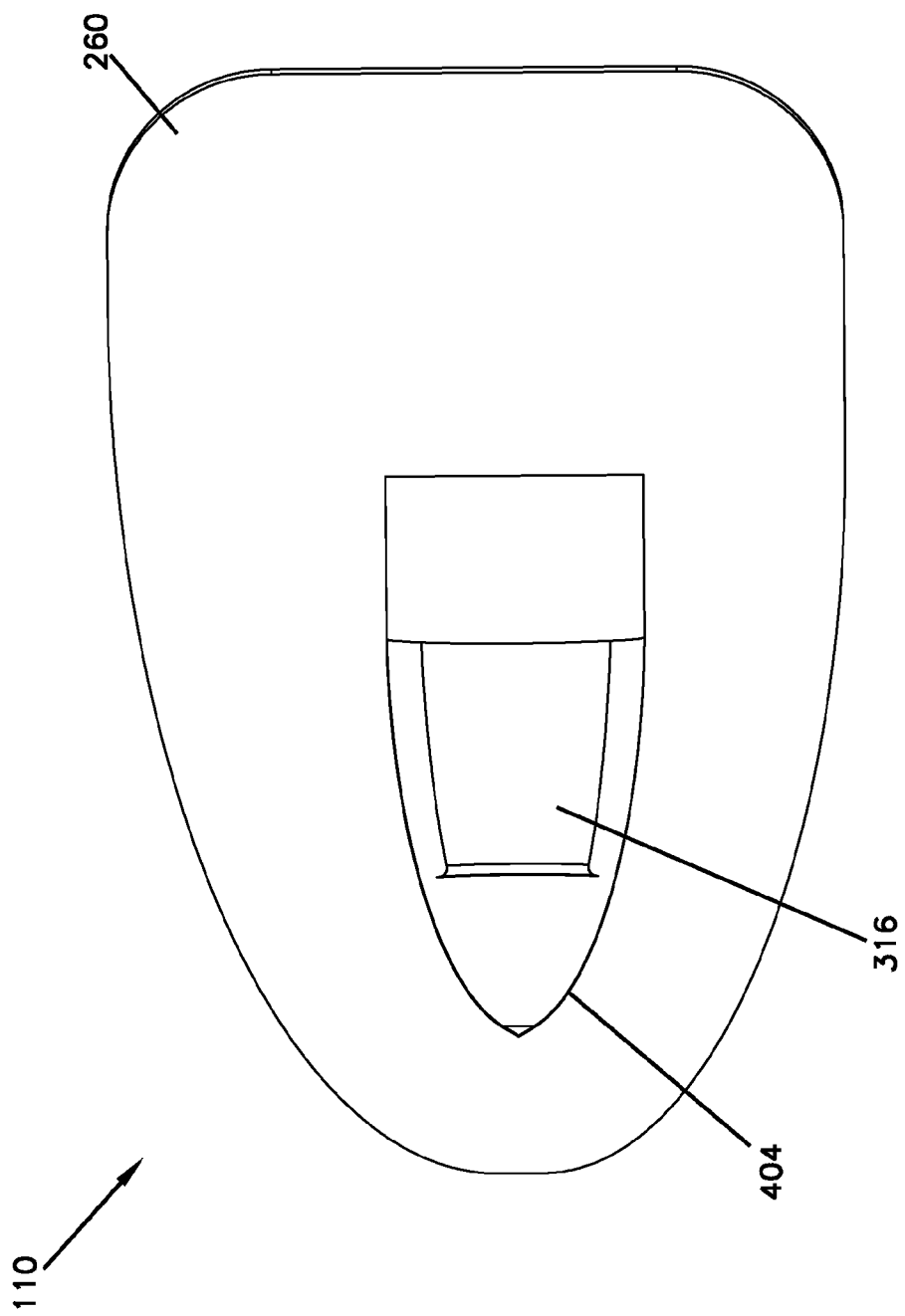
FIG. 7 shows bottom view of the coupler of FIG. 2.
Figure 8:
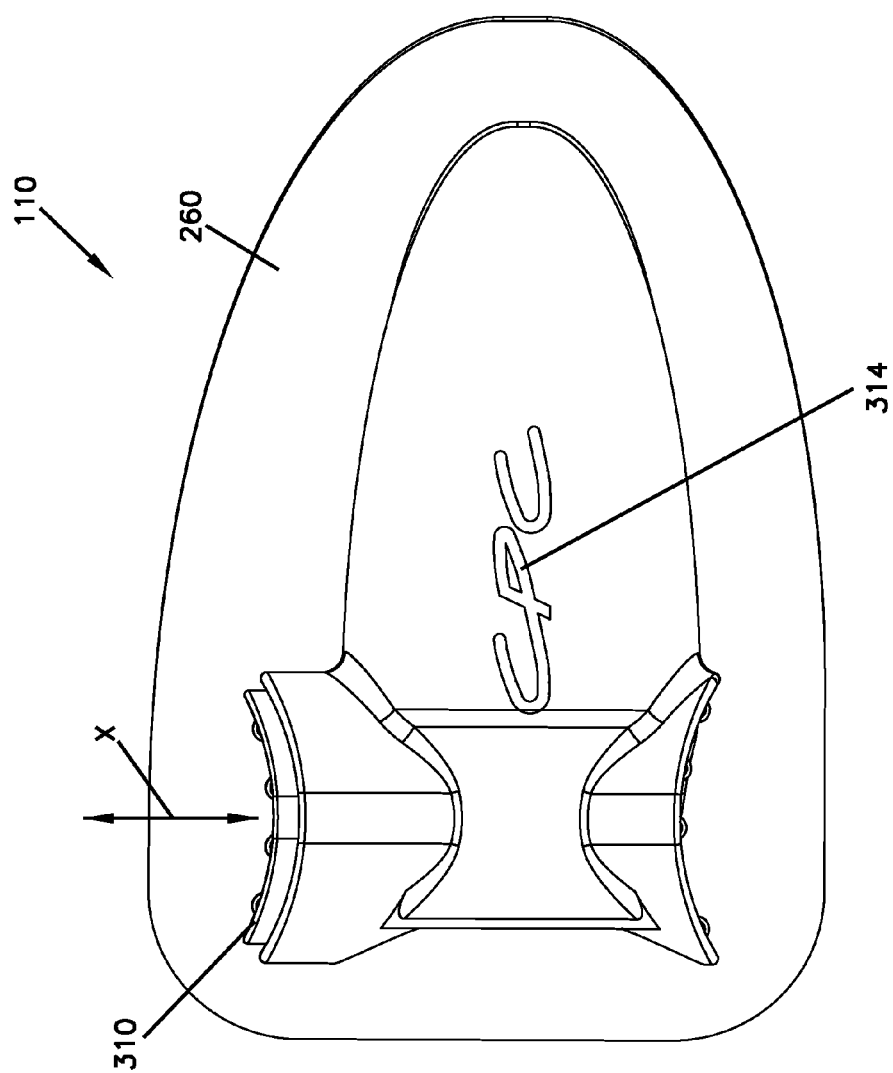
FIG. 8 shows a top view of the coupler of FIG. 2.
Figure 9:
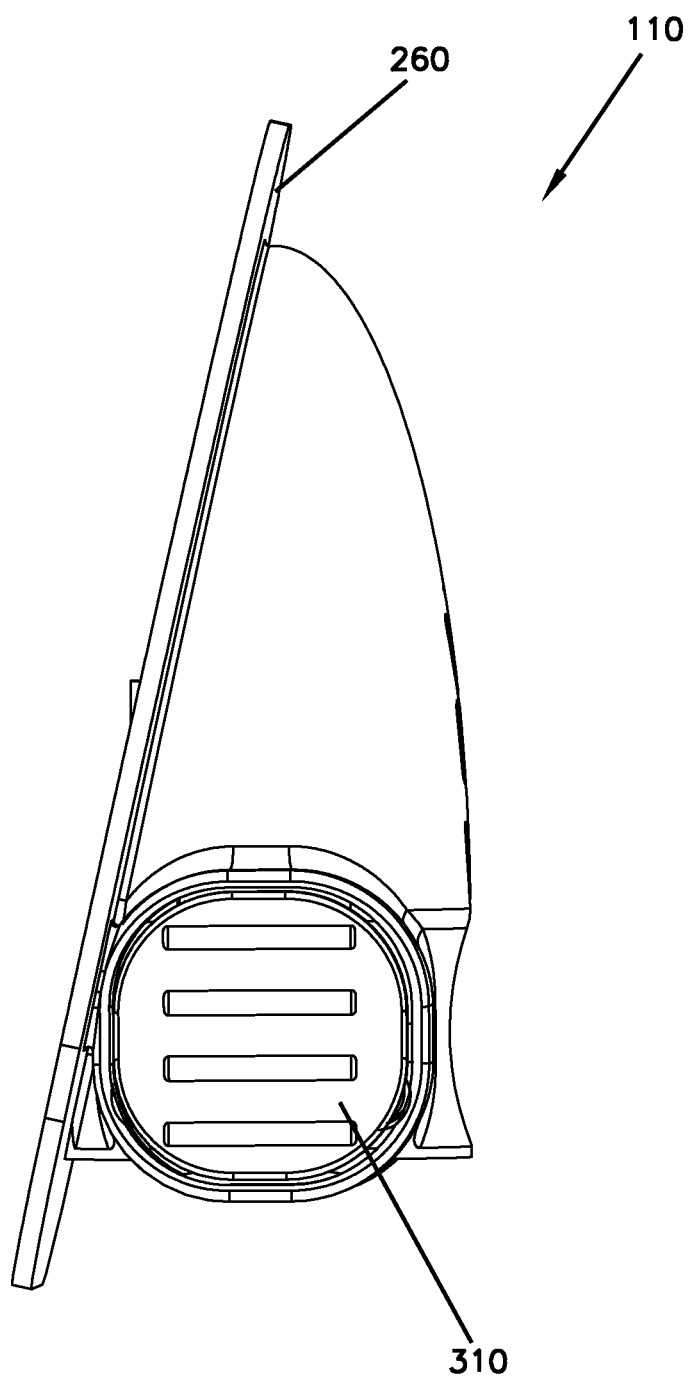
FIG. 9 shows another side view of the coupler of FIG. 2.
Figure 10:
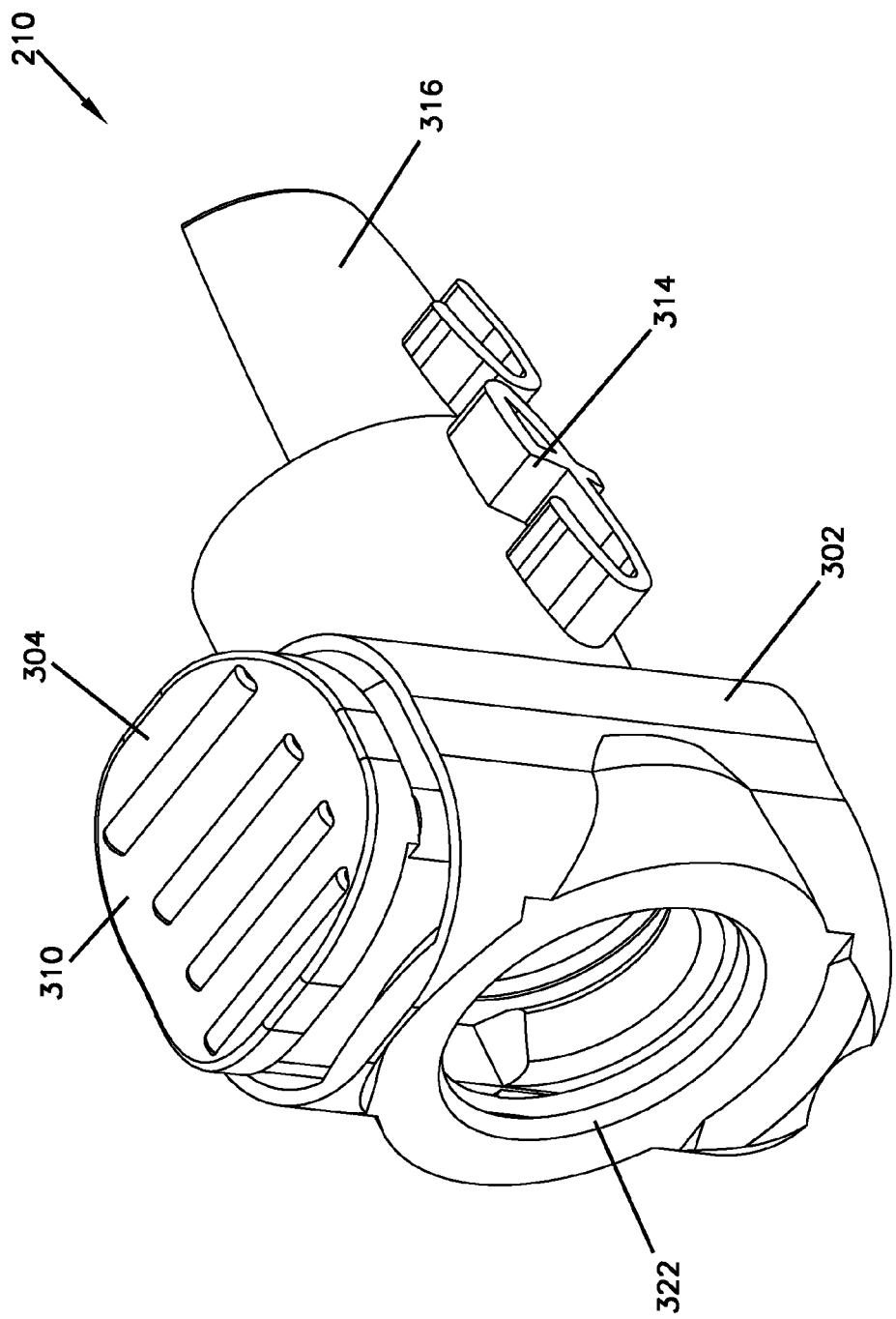
FIG. 10 shows a perspective view of an example coupling device of the coupler of FIG. 2.
Figure 11:
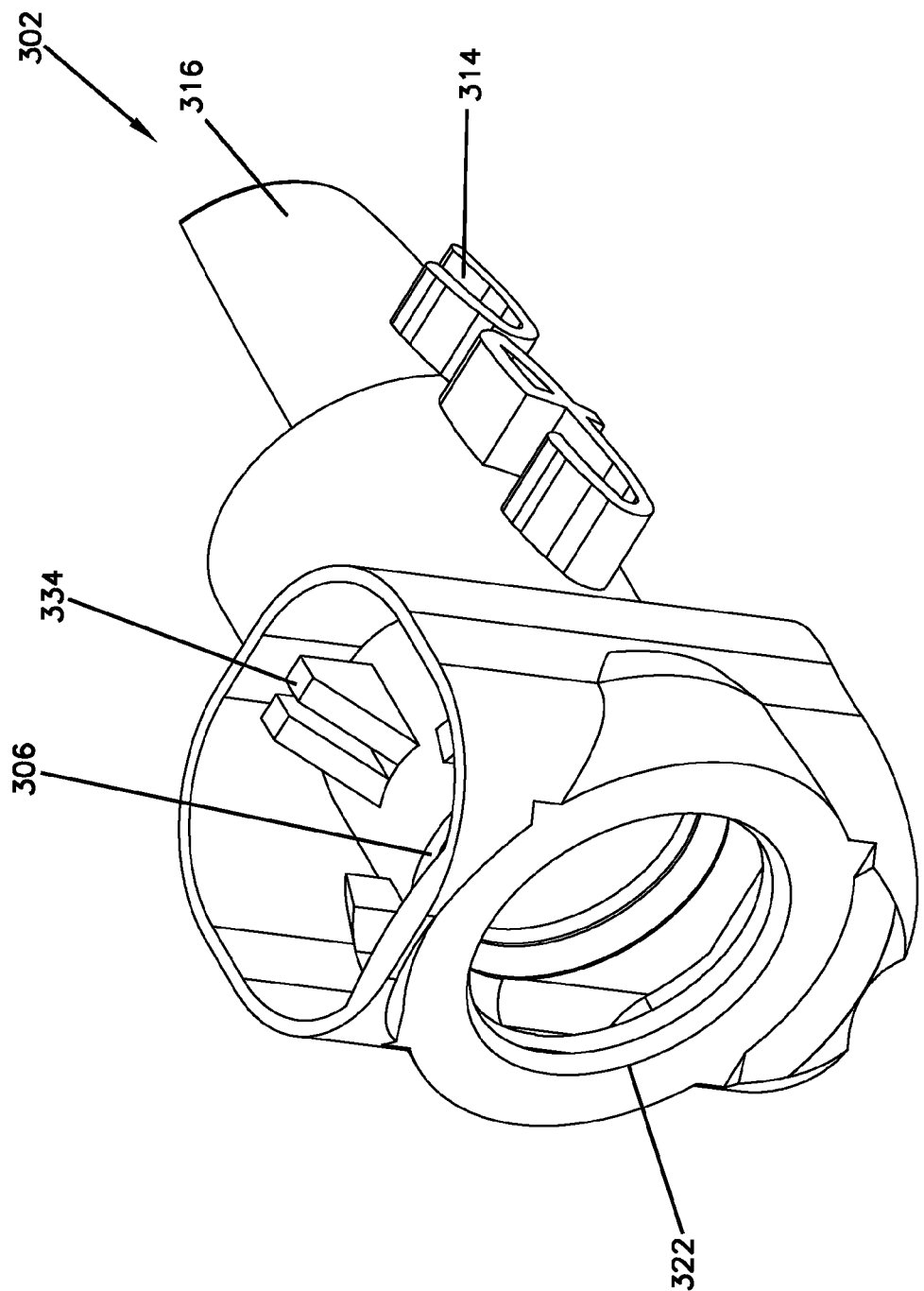
FIG. 11 shows a perspective view of an example body of the coupling device of FIG. 10.
Figure 12:
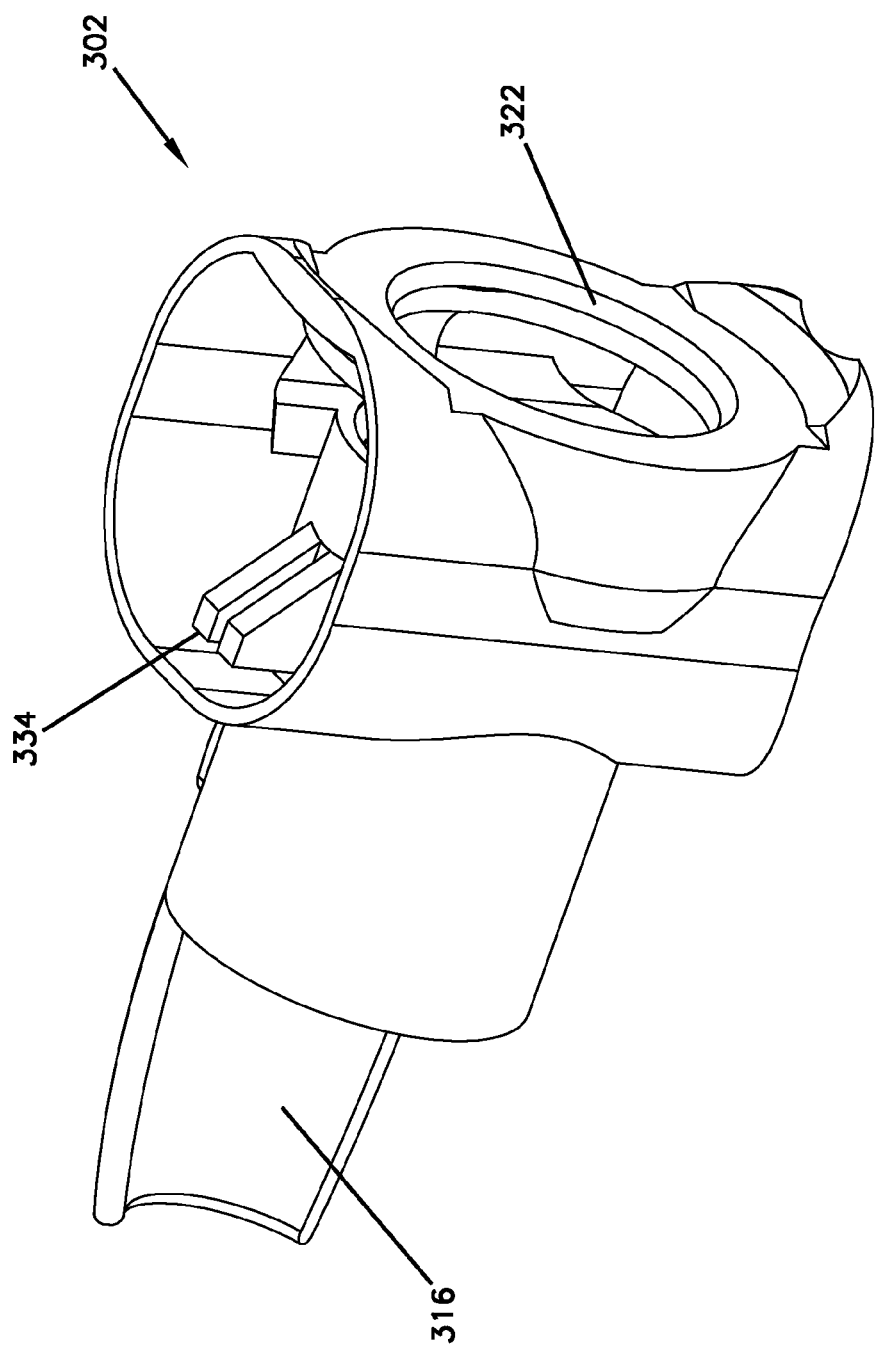
FIG. 12 shows another perspective view of the body of FIG. 11.
Figure 13:
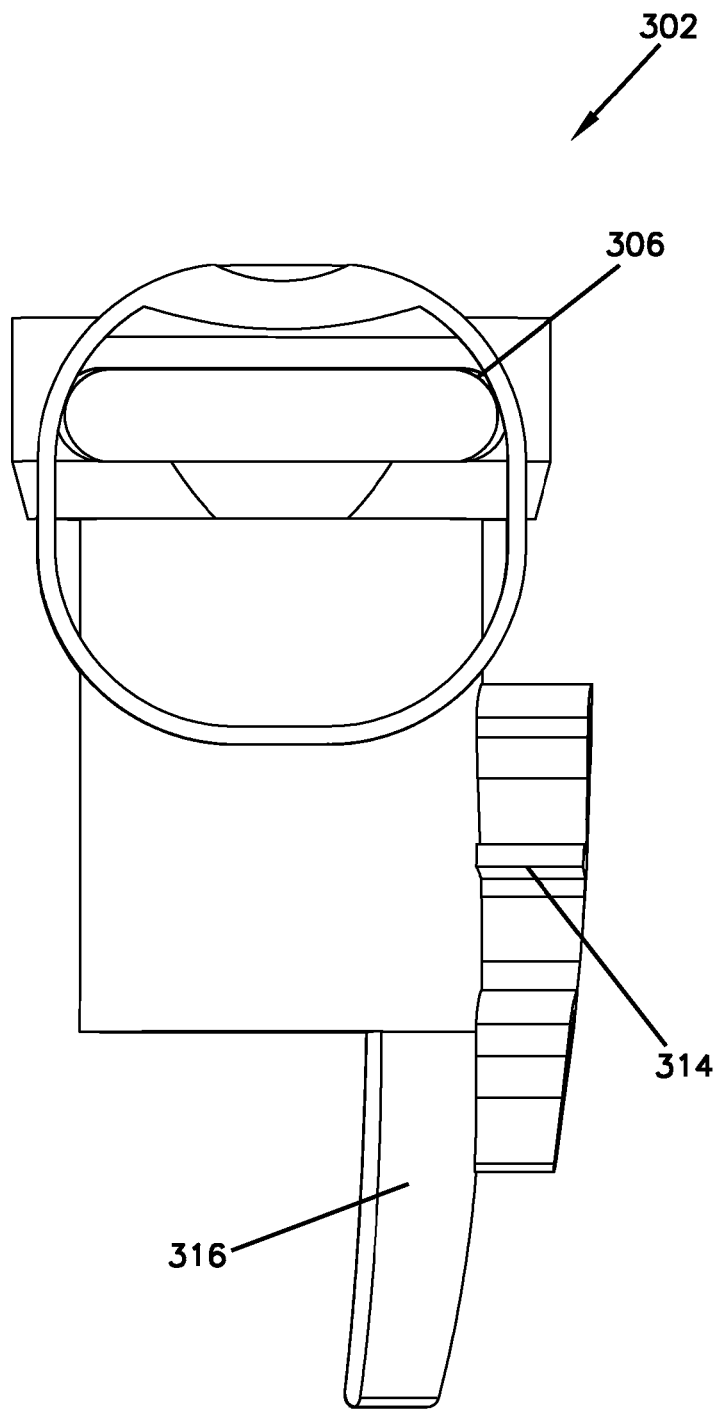
FIG. 13 shows a top view of the body of FIG. 11.
Figure 14:
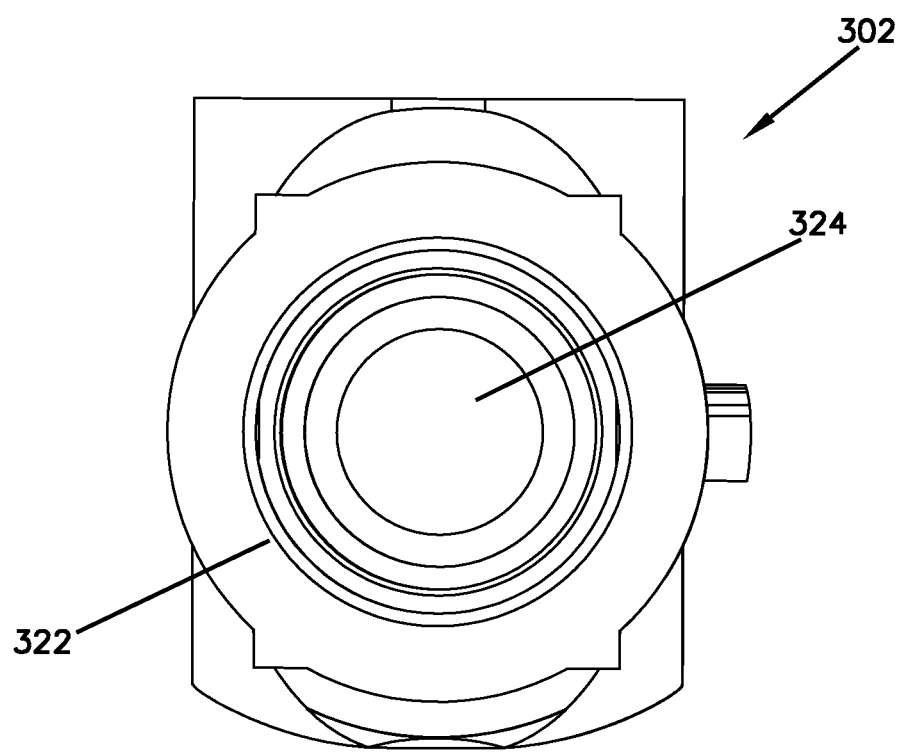
FIG. 14 shows an end view of the body of FIG. 11.
Figure 15:
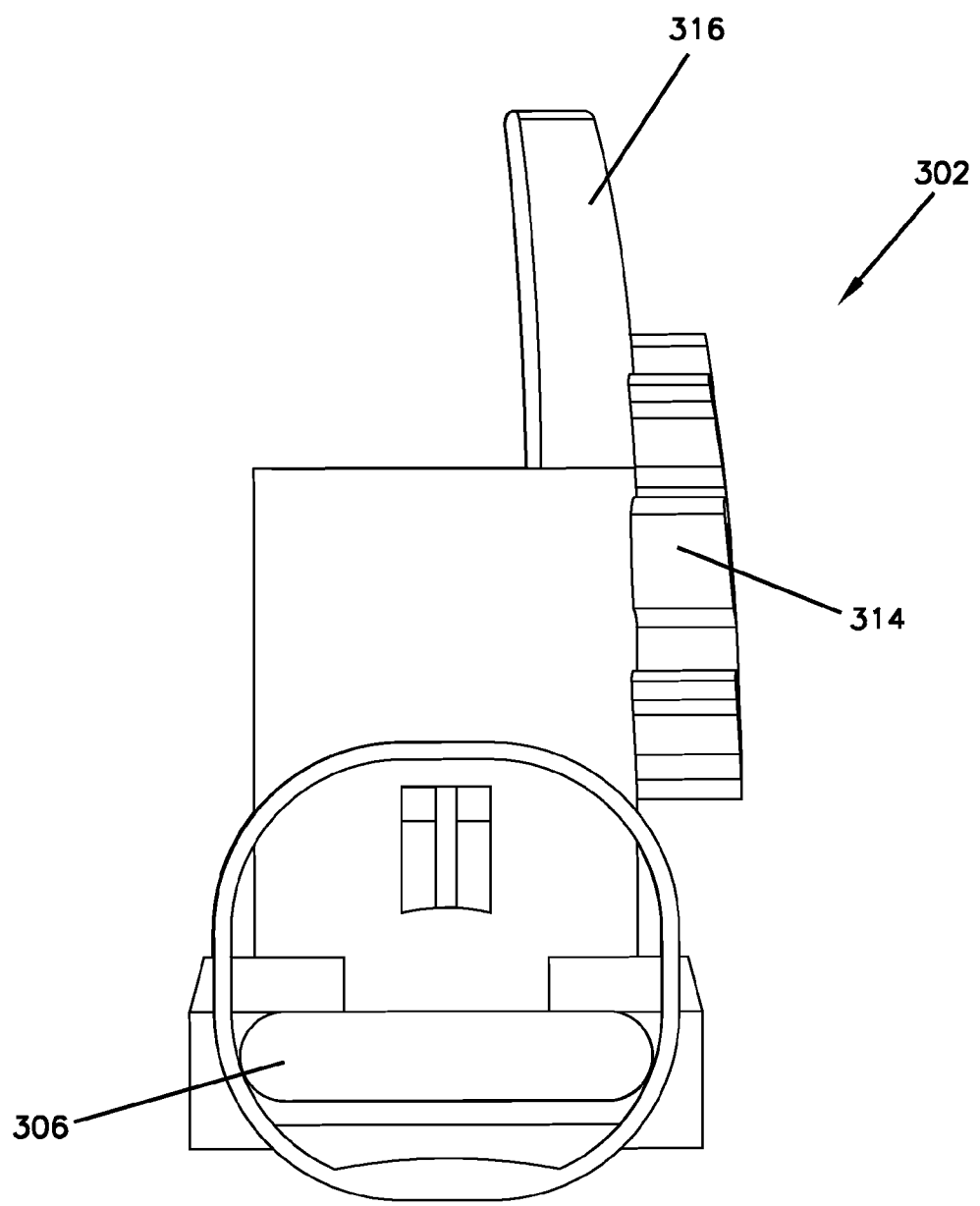
FIG. 15 shows a bottom view of the body of FIG. 11.
Figure 16:
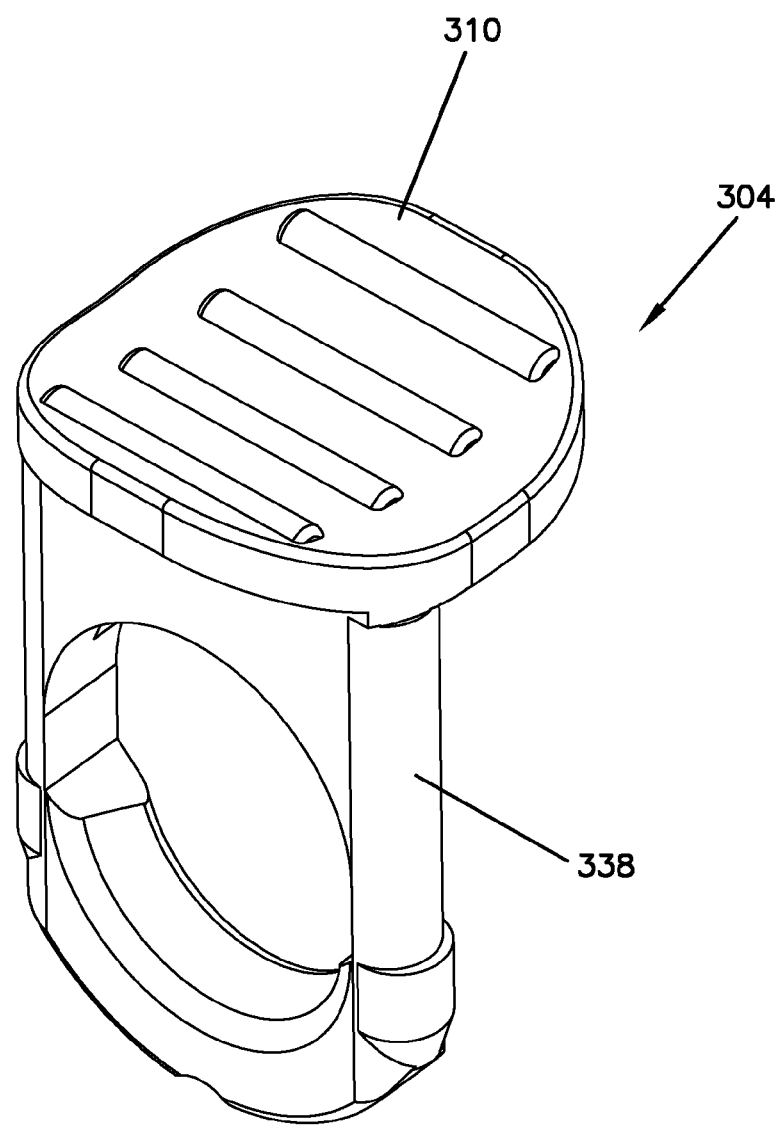
FIG. 16 shows a perspective view of an example latch of the coupling device of FIG. 10.
Figure 17:
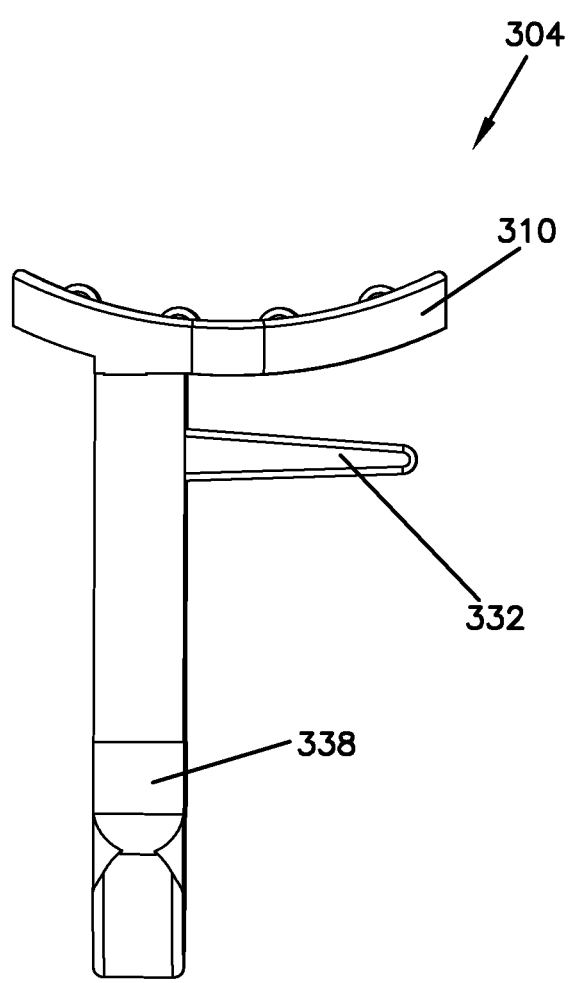
FIG. 17 shows a side view of the latch of FIG. 16.

Referring now to FIG. 1, an example hydration system 100 is shown. In this example, the hydration system includes a bladder 102.

The bladder 102 is a flexible reservoir that holds a fluid, such as water or other hydration products. As used herein, the term "fluid" means any substance that can be made to flow including, but not limited to, liquids, gases, granular or powdered solids, mixtures or emulsions of two or more fluids, suspensions of solids within liquids or gases, etc. Non-limiting examples of fluids include water and air.

The bladder 102 is typically made of a polymeric material (e.g., polyethylene or thermoplastic polyurethane). The bladder 102 expands as it is filled. The bladder 102 can be filled with the fluid through an aperture 104. The aperture 104 is sealed using a variety of methods, such as a cap or plug that closes the aperture 104 and contains the fluid in the bladder 102. In alternative designs, the bladder 102 may not include the aperture 104, but instead be filled through the coupler described below.

In other examples, the bladder 102 can take other shapes and forms. For example, the bladder 102 can be formed of a rigid, inflexible material or be shaped in a different manner. For example, some bladders are filled through an open end of the bladder, and the open end is then folded to form a closed space within the bladder.

A coupler 110 is coupled to the bladder 102. In this example, the coupler 110 is in fluid communication with the interior of the bladder 102 through an aperture formed in the bladder 102.

Also shown is a mating coupler 120 that is connected to the coupler 110. A conduit 130 is attached to the mating coupler 120, and a mouth piece 140 is positioned at an opposite end of the conduit 130. With the mating coupler 120 attached to the coupler 110, fluid from the bladder 102 can flow through the couplers 110, 120 and into the conduit 130. An individual can place the mouth piece 140 into the individual's mouth to move fluid from the bladder 102, through the couplers 110, 120, conduit 130, and mouth piece 140 into the individual's mouth.

In some embodiments, valving can be provided in the couplers 110, 120 to restrict the movement of the fluid. See FIGS. 21-24. In other embodiments, different valving, such as a valve and tap, can be used, particularly if the bladder is pressurized.

Referring now to FIGS. 2-9, the coupler 110 is shown. The coupler 110 generally includes a coupling device 210 and a base 260.

The coupling device 210 is also shown in FIGS. 10-17. The coupling device 210 generally includes a body 302 and a latch 304.

The body 302 is female, and it forms an aperture 322 in communication with a fluid passage 324 extending through the body 302. The aperture 322 is sized to receive a mating coupler (e.g., coupler 120, sometimes referred to as an insert—see FIGS. 21-24) that is inserted therethrough. The body 302 also forms a slot 306 in which a body 338 of the latch 304 is inserted. The latch 304 moves in direction X, generally transverse to the longitudinal axis of the body 302, between coupled and uncoupled states to couple and uncouple the mating coupler 120. A user presses on a thumb pad 310 of the latch 304 to move the latch 304 between the coupled and uncoupled states.

A cantilever 332 engages a ramp 334 of the body 302 to bias the latch 304 into the coupled state. When the user presses the thumb pad 310 in the direction X, the lever elastically deforms to allow the latch 304 to move in the direction X to the uncoupled state. When the user releases the thumb pad 310, the cantilever 332 pushes the latch 304 back to the coupled state.

The body 302 also includes a logo 314 formed in the body 302. The logo 314 is spaced from the body 302 so that the logo 314 is exposed when the base 260 is formed around the body 302. The logo 314 can be modified aesthetically (e.g., shape and color) to provide a desired effect.

The body 302 is angled so that the overall profile of the coupler 110 is reduced. For example, the body 302 can be positioned at a desired angle D relative to the base 260 to reduce the profile of the coupler 110. See FIG. 5. In examples, the angle D is 8 to 12 degrees, although other orientations can be used. For example, in another embodiment, angle D is approximately 3 degrees.

In addition, an optional shroud 316 is positioned to control or define an allowable distortion of the base 260 surrounding the shroud 316 within the aperture 404 so that the base 260 is not deformed to cut off the flow of fluid to the coupling device 210. See FIG. 7.

In this example, the coupling device 210 is a quick disconnect coupling configured to be mated with another quick disconnect coupling. An example of a coupling device that is consistent with the coupling device 210 is shown in U.S. Pat. No. 5,104,158 filed on May 31, 1991, the entirety of which is hereby incorporated by reference.

Figure 18:
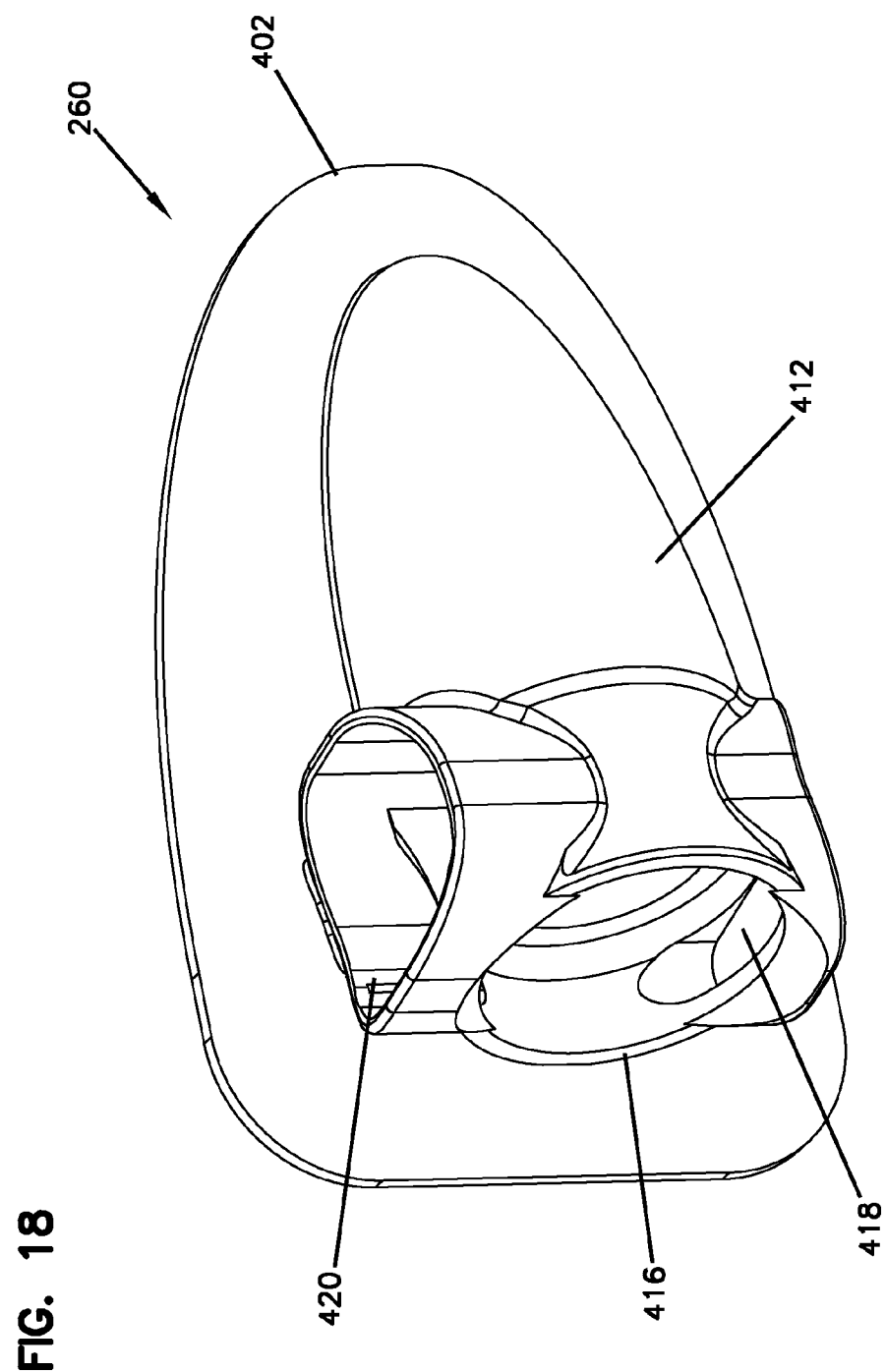
FIG. 18 shows a perspective view of an example base of the coupler of FIG. 2.
Figure 19:
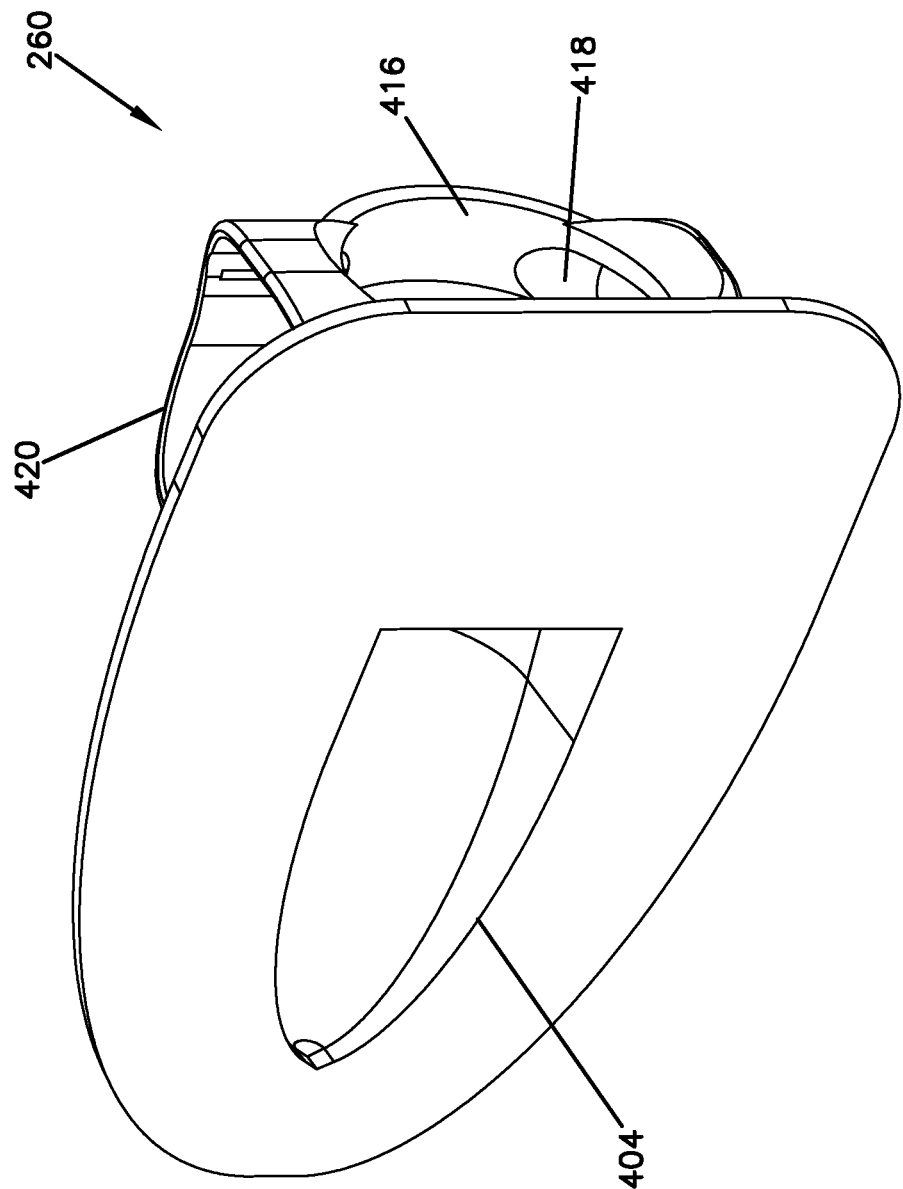
FIG. 19 shows another perspective view of the base of FIG. 18.
Figure 20:
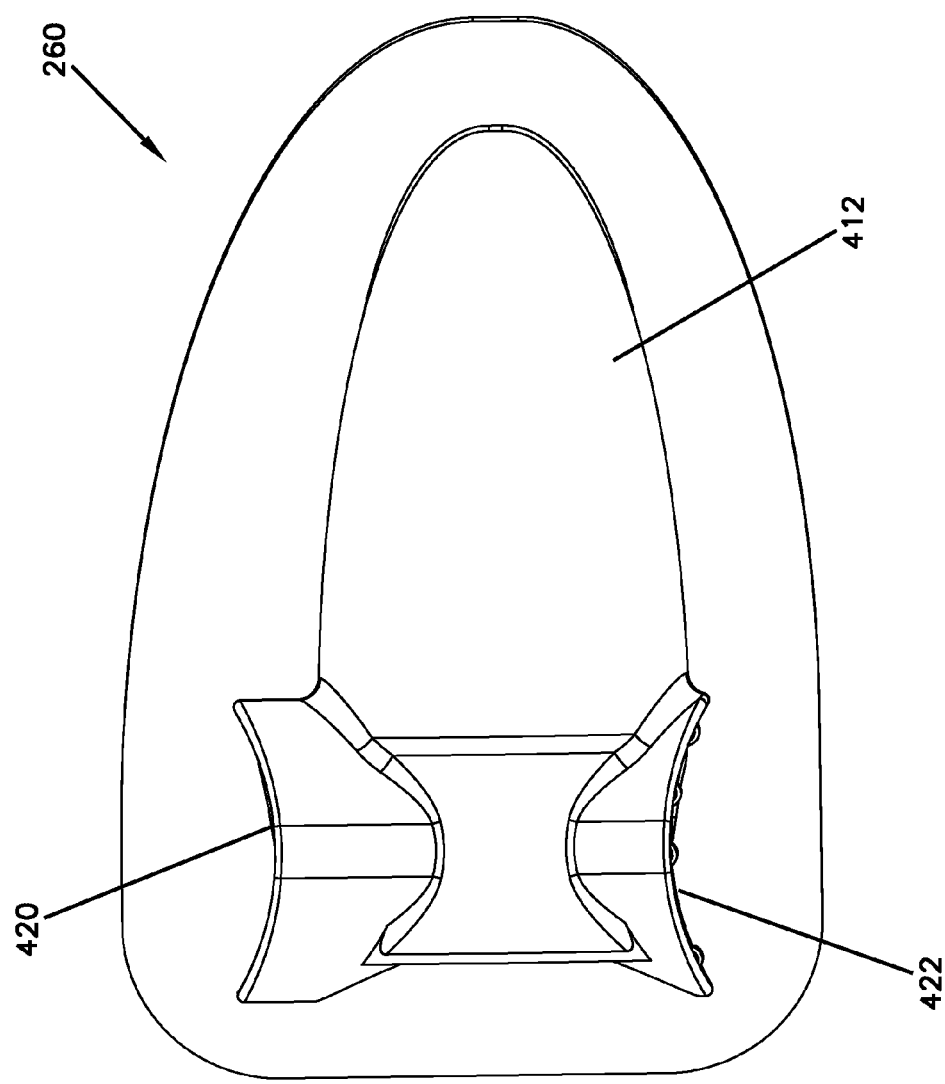
FIG. 20 shows a top view of the base of FIG. 18.

Referring to FIGS. 18-20, the base 260 is shown. In this example, the base 260 includes a flange member 402 which is sized to be coupled to the bladder 102. In this example, the flange member 402 is planar and formed of a flexible material that can be coupled to the bladder 102. Example techniques for coupling the flange member 402 to the bladder 102 include welding (e.g., ultrasonic welding or RF welding), staking, gluing, etc.

The flange member 402 can be formed in different shapes as desired. For example, the flange member 402 can be increased in size to accommodate larger couplers if increased flow rates are necessary or to provide a greater surface area for adherence to the bladder, if needed. The shape can also be modified for aesthetic purposes.

Since the base 260 is flexible, the flange member 402 can conform to the shape of the bladder 102. In these examples, the flange member 402 forms a fluid-tight seal with the bladder 102 so that an aperture 404 formed in the base 260 is in fluid communication with the interior of the bladder 102 so that fluid can flow therethrough and into the coupling device 210, as described further herein.

The base 260 also includes a receiving member 412 that is sized to accommodate the coupling device 210. (In the given example, the size of the receiving member 412 is actually dictated by the size of the coupling device 210, since the receiving member 412 is formed as a second shot during the molding process, as described below.) In this example, the receiving member 412 includes an aperture 416 which exposes the aperture 322 of the body 302. The receiving member 412 also includes a slot 418 corresponding to that of the latch 304 to allow the latch 304 to be moved in the direction X into the uncoupled state. Further, the receiving member 412 includes an opening 420 sized to expose the thumb pad 310 of the latch 304.

The receiving member 412 also includes a rest 422 configured to allow the individual to place a finger against the rest 422. For example, the rest 422 is positioned and shaped so that an individual can place an index finger against the rest 422 when using a thumb to depress the thumb pad 310 of the latch 304, which is positioned in an opposing manner. The rest 422 is sufficiently distanced from the slot 418 so that the latch 304 can be moved in the direction X into the fully uncoupled or released position without the user's finger inhibiting the movement of the latch 304.

In this example, the coupling device 210 and the base 260 of the coupler 110 are made of materials that allow the coupler 110 to be formed in a two-shot molding process. In this example, the coupling device 210 is made of polypropylene, ABS, ABC/PC blend, polycarbonate, etc., and the base 260 is made of a thermoplastic, such as polyurethane (TPU) or polyethylene. The materials can be selected to allow for adherence between the first and second shots, as well as adherence to the bladder, thereby minimizing the possibility of leakage. Other materials can be used.

In example embodiments, the latch 304 is made of a material with properties suited for a spring (i.e., a cantilever). Examples of such materials include acetal, polycarbonate, and polysulfone.

The coupler 110 is formed by first molding the coupling device 210 in a first shot of the two-shot molding process. In this example, the material used to form the coupling device 210 is such that it is generally rigid and inflexible.

The remainder of the coupler 110 is then formed by molding the base 260 around the coupling device 210 in a second shot of the two-shot molding process. In this example, the base 260 is overmolded onto the coupling device 210 so that the base 260 and the coupling device 210 form an integral structure for the coupler 110. The coupler 110 is thereby formed so that it is generally fluid-tight. The base 260 is generally flexible or semi-rigid, but could be rigid.

Once the base 260 is formed, the latch 304 can be placed into the slot 306 to complete the manufacture of the coupler 110. As described above, the coupler 110 can thereupon be coupled to the bladder 102 to form a fluid-tight seal.

In other examples, other manufacturing techniques can be used to form the coupling device 210 and the base 260 of the coupler 110. For example, these features can be formed using an insert-molded technique with two discrete molding steps.

Referring now to FIGS. 21-24, another example coupler 410 is shown. The coupler 410 is similar to the coupler 110 described above, except the coupler 410 is valved.

Figure 21:
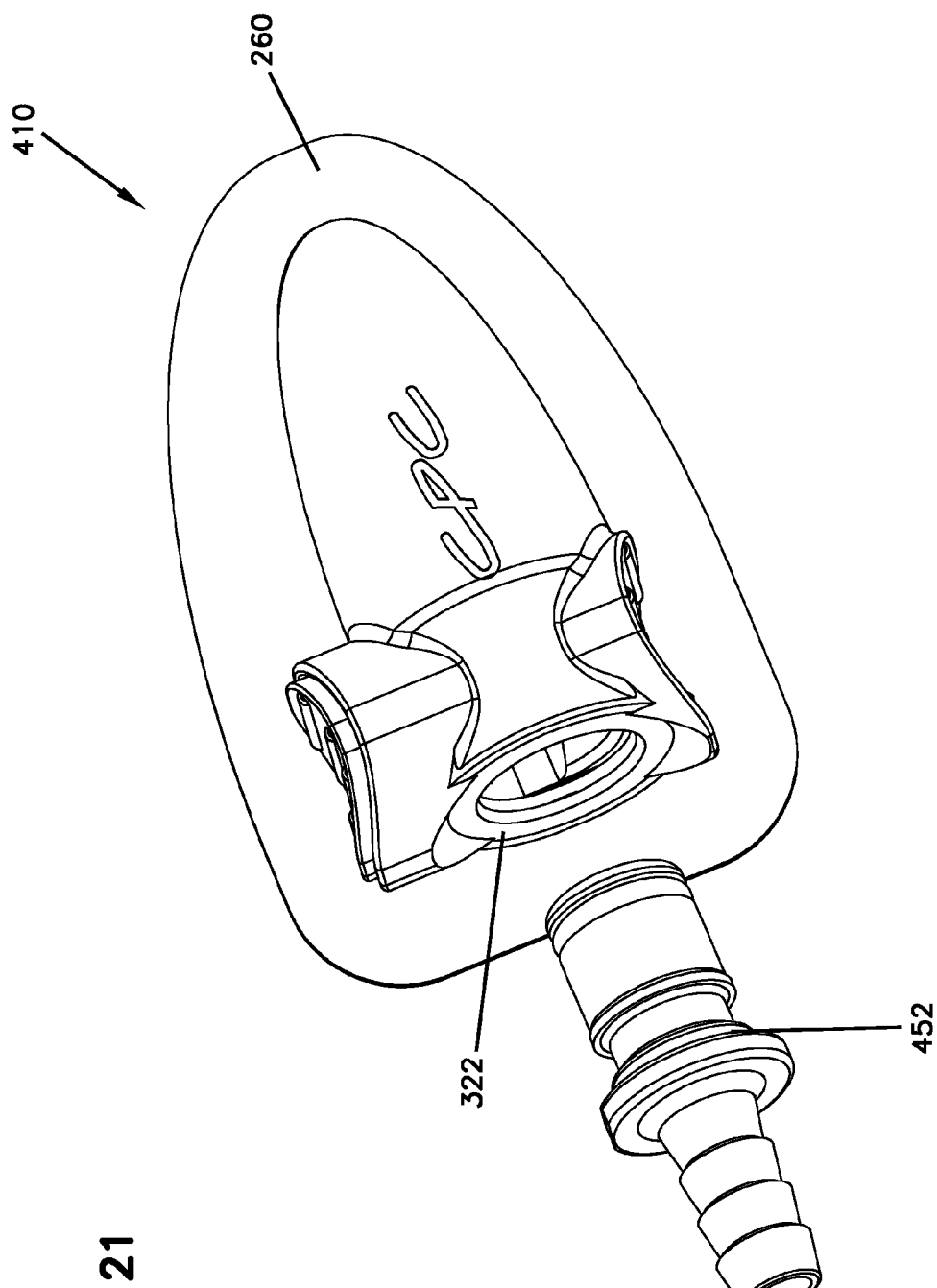
FIG. 21 shows a perspective view of another example coupling assembly.
Figure 22:
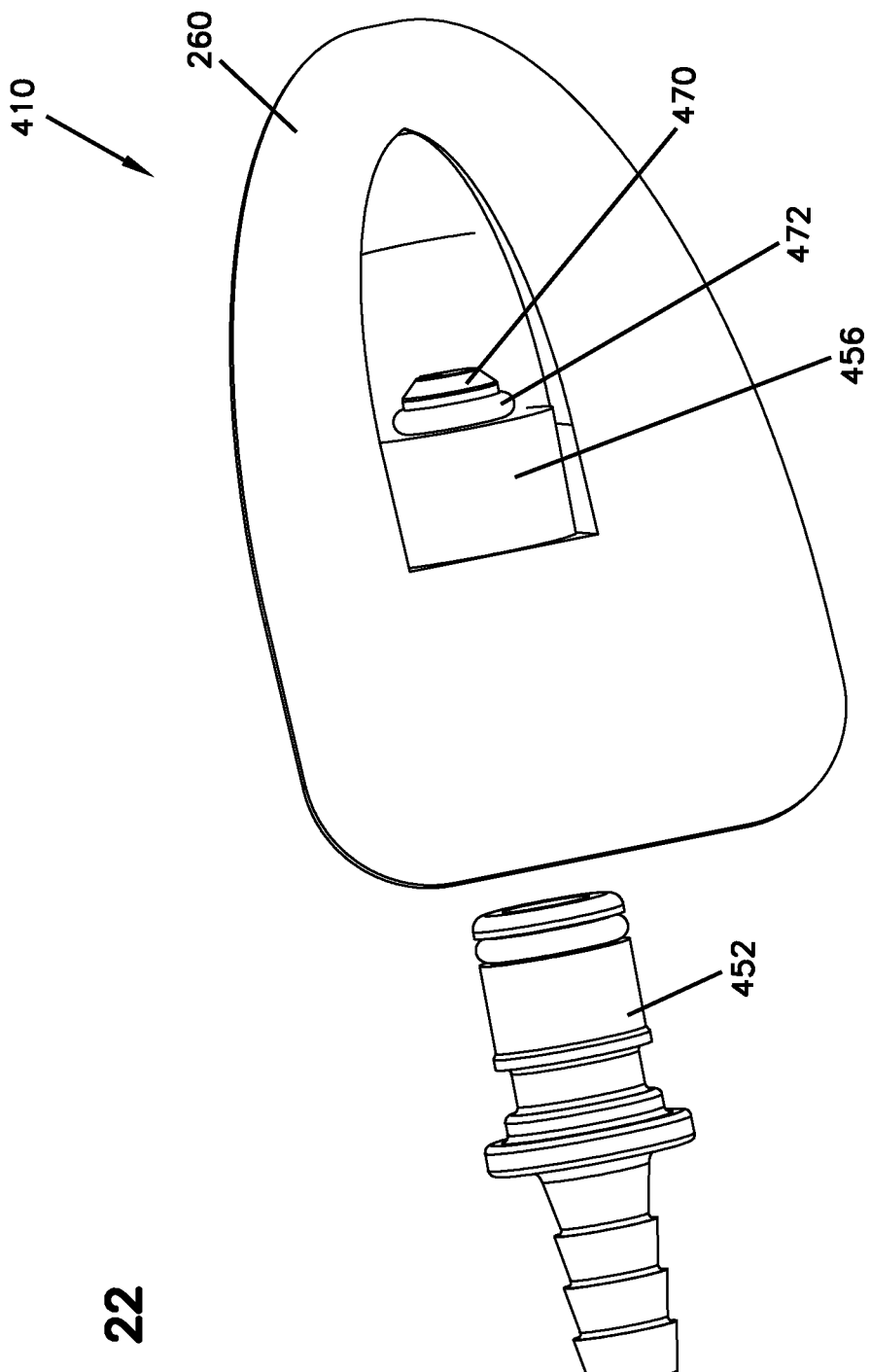
FIG. 22 shows a bottom view of the coupling assembly of FIG. 21.

Referring to FIGS. 21 and 22, the coupler 410 is shown in an uncoupled state, with a mating coupling device 452 being disconnected from the coupler 410. In this configuration, a valve member 470 is positioned in a closed position within the fluid passage 324 of the coupling device 210 to limit the flow of fluid through the coupler 410. A gasket 472 (e.g., O-ring) of the valve member 470 seals the valve member 470 against an end 456 of the coupling device to stop the flow of fluid through the coupler 410 when in the uncoupled state.

Figure 23:
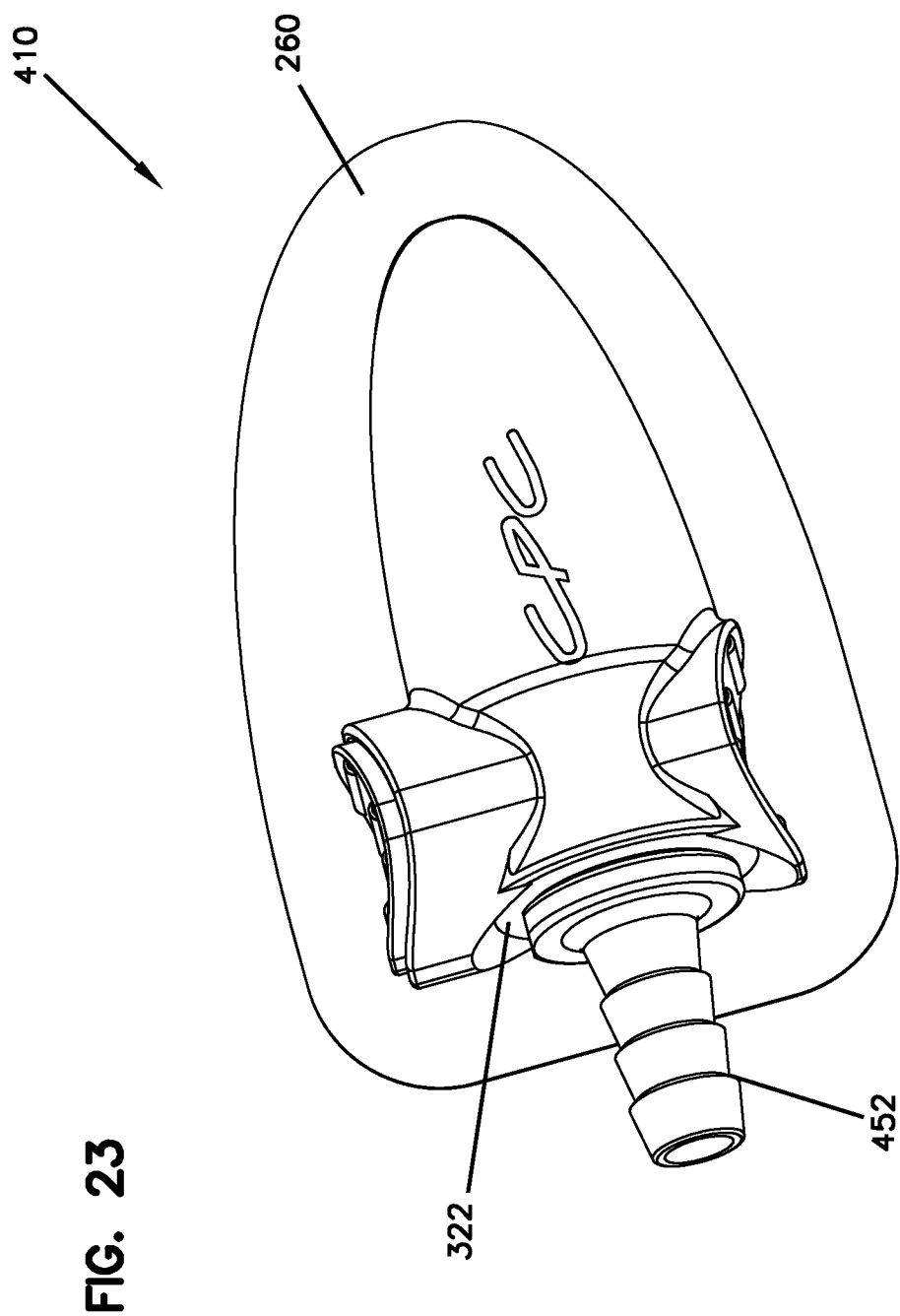
FIG. 23 shows another perspective view of the coupling assembly of FIG. 21.
Figure 24:
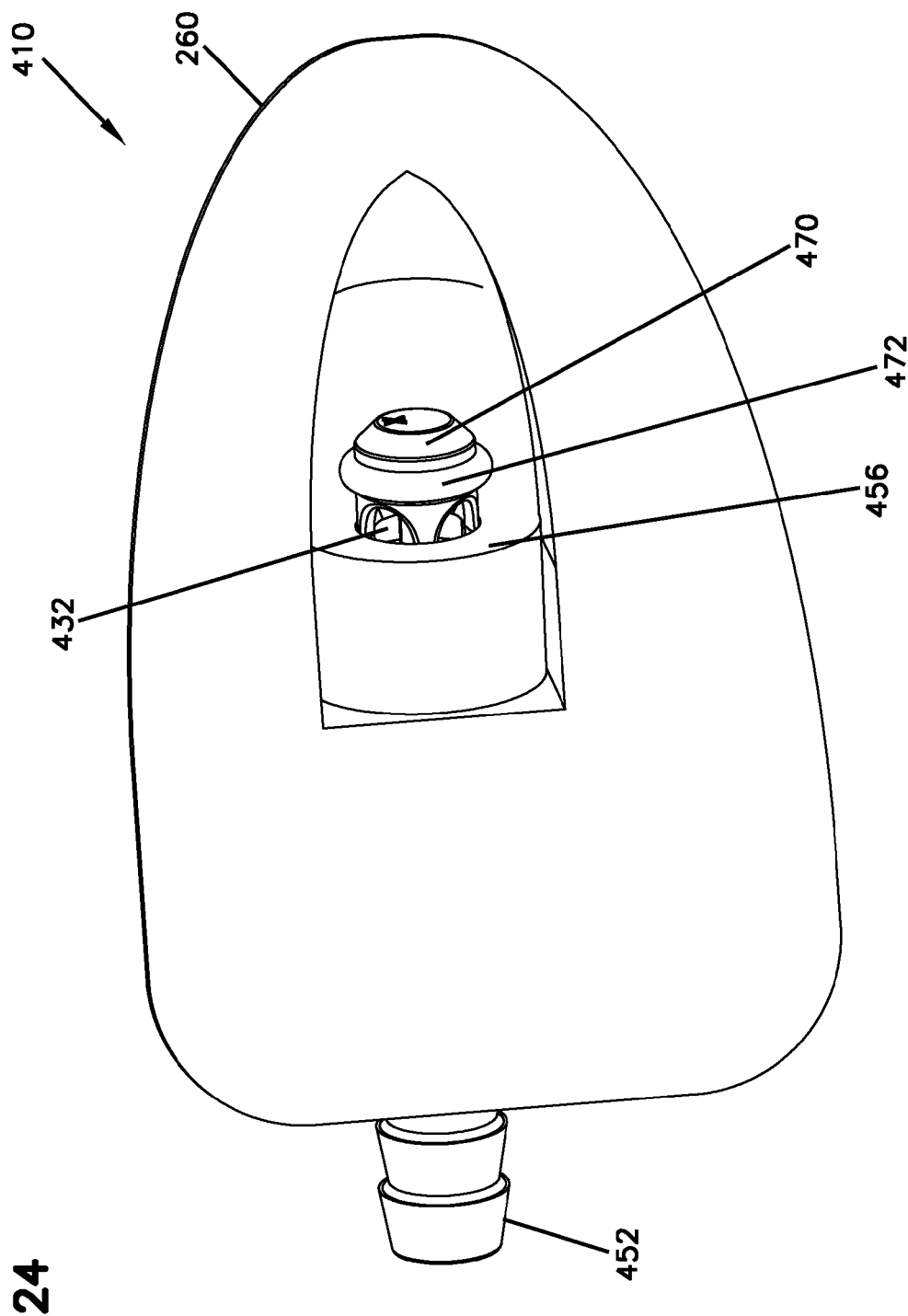
FIG. 24 shows another bottom view of the coupling assembly of FIG. 21.
Figure 25:
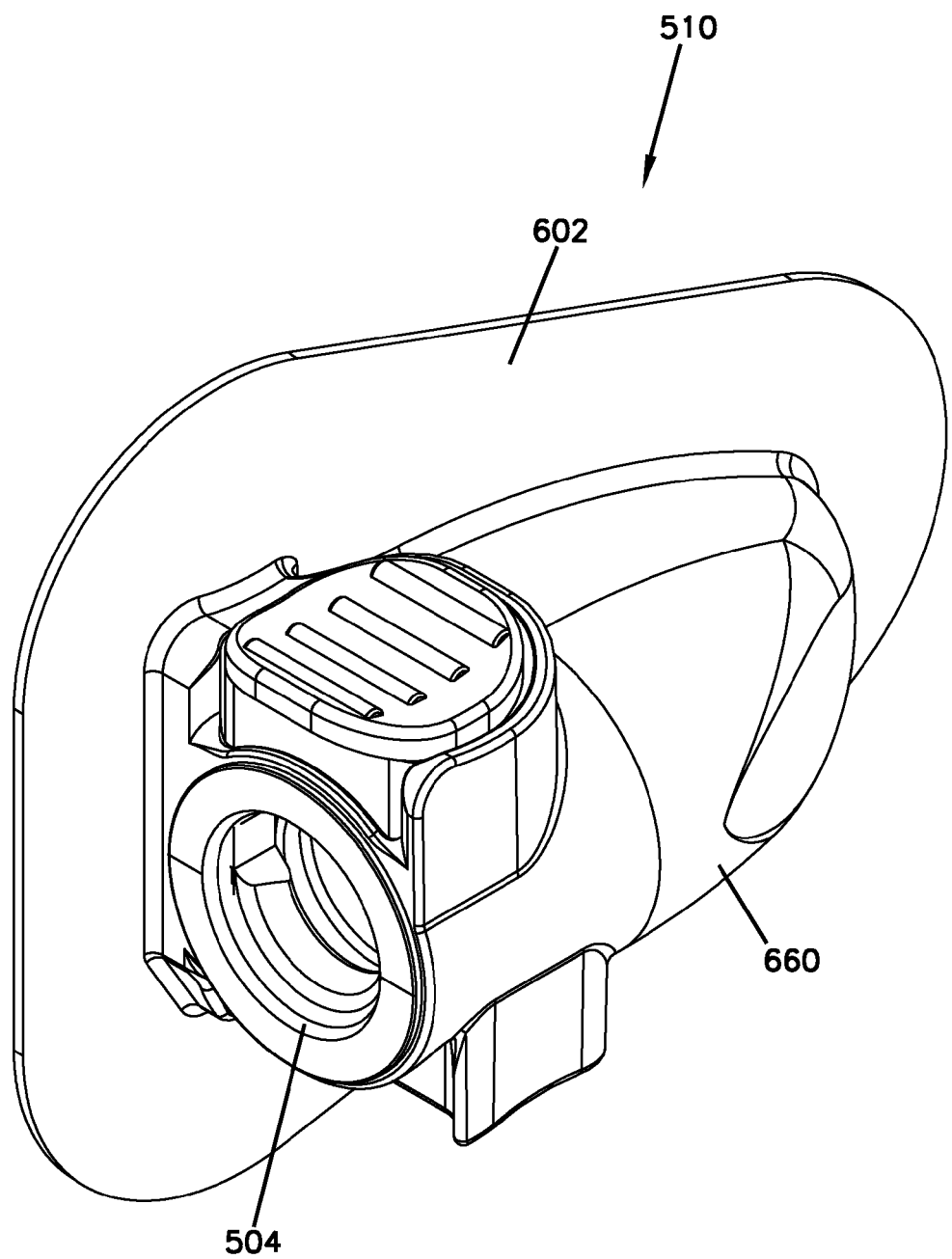
FIG. 25 shows a perspective view of another example coupler.
Figure 26:
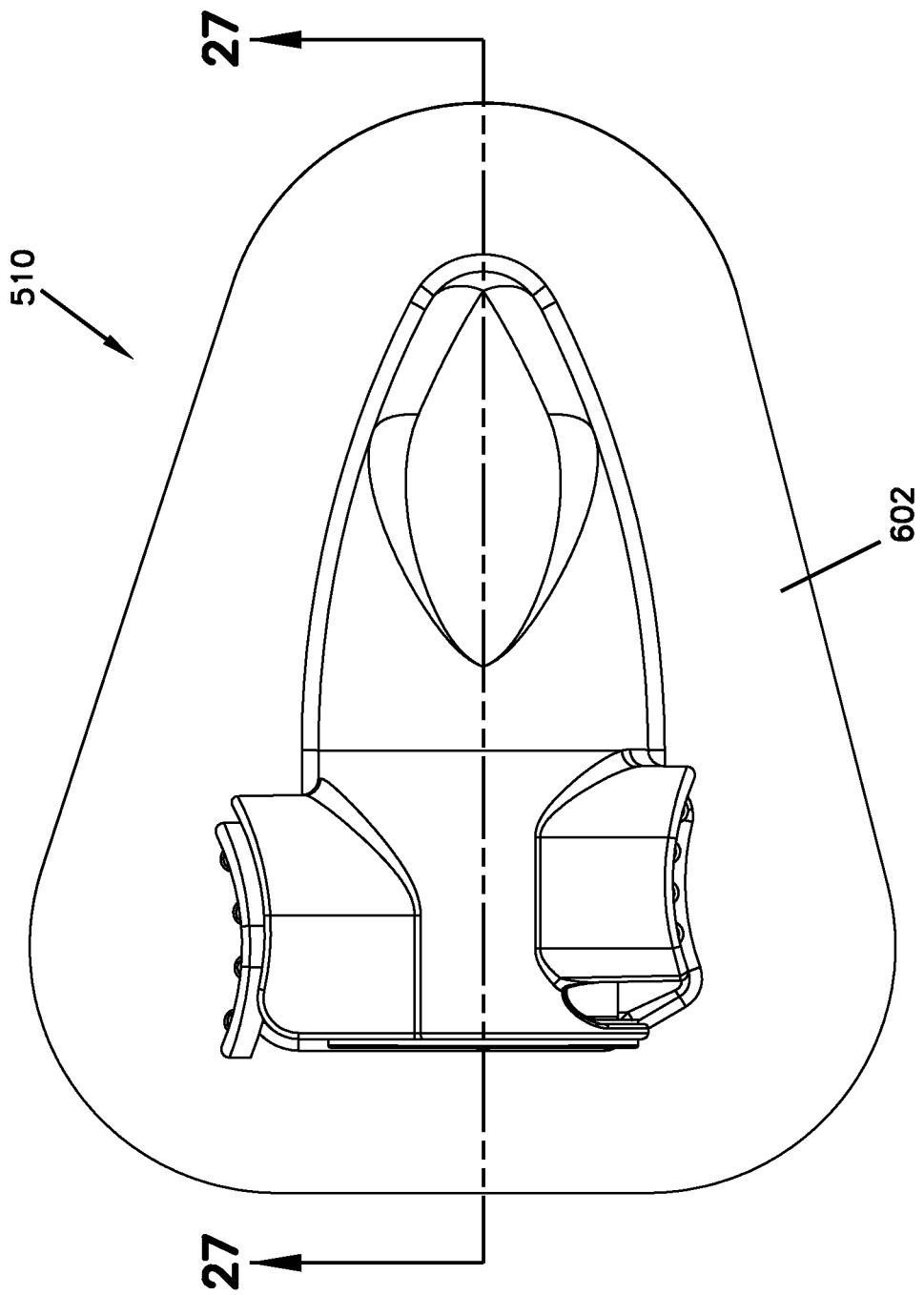
FIG. 26 shows a top view of the coupler of FIG. 25.

Referring now to FIGS. 23-24, the mating coupling device 452 is connected to the coupler 410 in the coupled state. When the mating coupling device 452 is inserted into the fluid passage 324 of the coupling device 210 to form the coupled state, the mating coupling device 452 pushes the valve member 470 so that the gasket 472 is unseated from the end 456 into an open position. In this open position, windows 432 in the valve member 470 are exposed that allow fluid to pass through the valve member 470 into the fluid passage 324 of the coupling device 210. In this coupled state with the valve member 470 unseated, fluid can flow through the coupler 410, namely from the bladder, through the coupler 410, into the mating coupling device 452, and out to a desired destination.

Once the mating coupling device 452 is disconnected, the valve member 470 returns to the closed position, and the valve member 470 limits the flow of fluid through the coupler 410. Different embodiments can include or exclude such valving.

The valve member 470 can be made of various materials, such as the same materials as that used for the coupling device 210 (e.g., acetal).

In alternative embodiments, various features or standoffs can be provided on a backside of the base 260. These standoffs would extend into the bladder 102 and function to keep an opposing surface of the bladder 102 from pushing against and sealing the aperture 404 and thereby limiting fluid flow therethrough.

Referring now to FIGS. 25-30, another example coupler 510 is shown. The coupler 510 is similar to the coupler 410 described above, with noted exceptions below.

Figure 27:
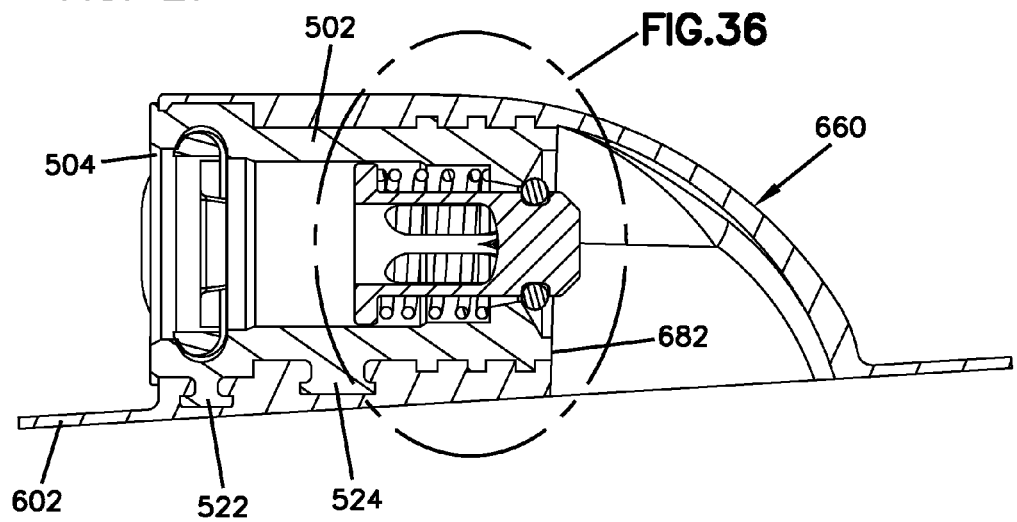
FIG. 27 shows a cross-sectional view along line 27-27 of the coupler of FIG. 26.
Figure 28:
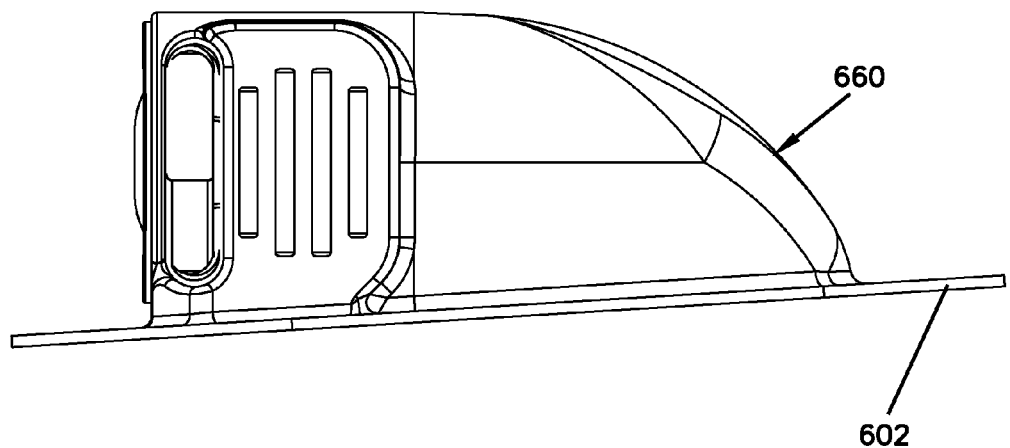
FIG. 28 shows a side view of the coupler of FIG. 25.
Figure 29:
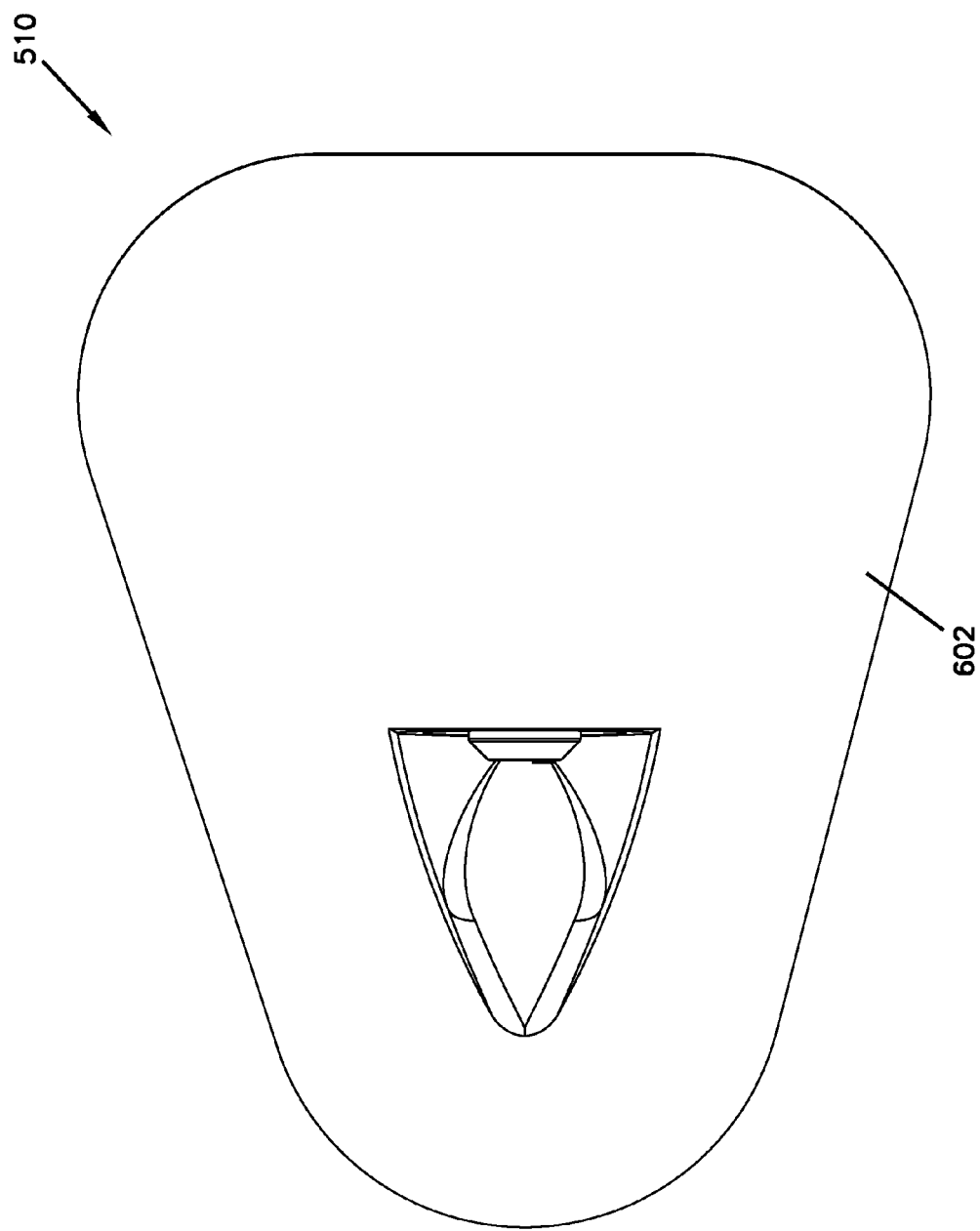
FIG. 29 shows a bottom view of the coupler of FIG. 25.
Figure 30:
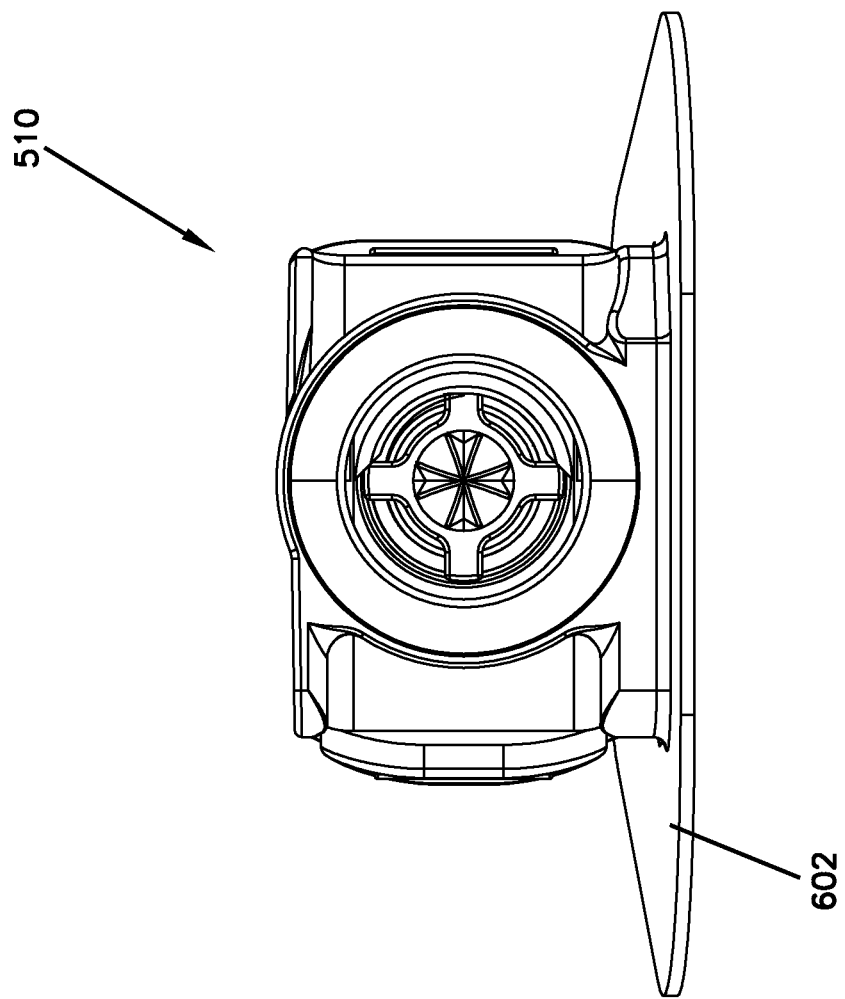
FIG. 30 shows an end view of the coupler of FIG. 25.
Figure 31:
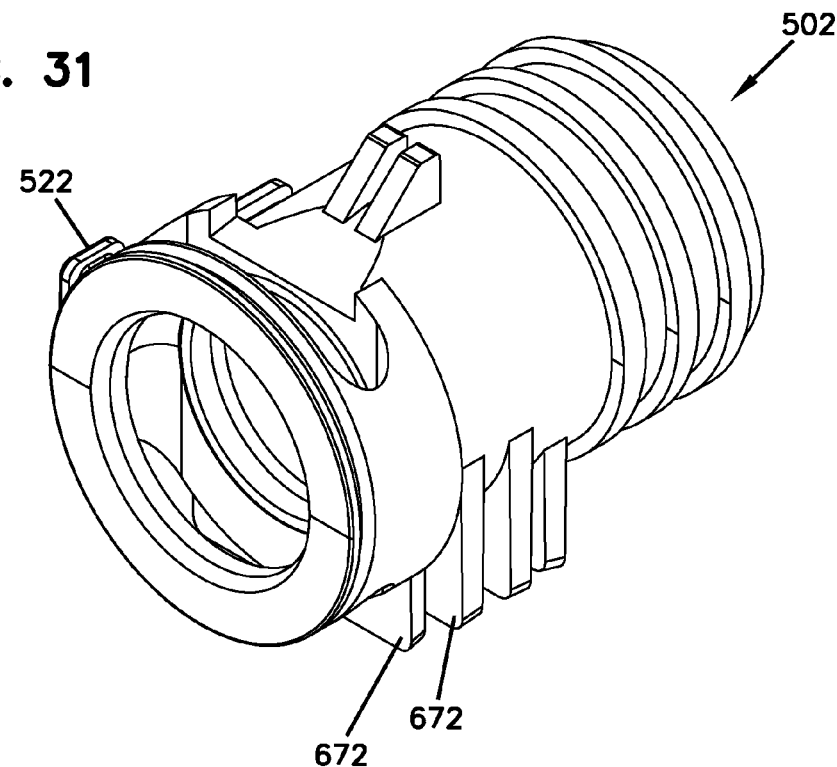
FIG. 31 shows a perspective view of an example body of the coupler of FIG. 25.
Figure 32:
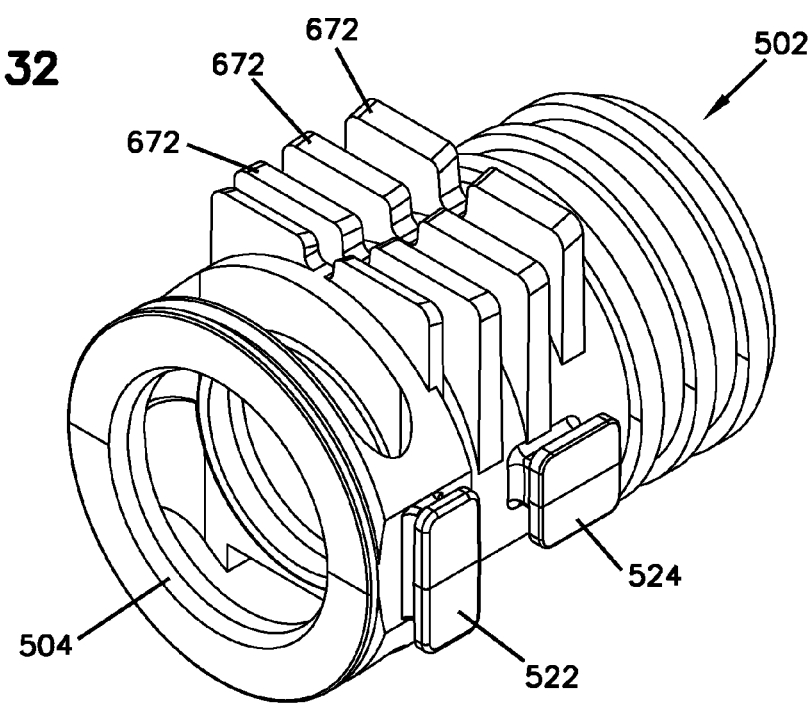
FIG. 32 shows another perspective view of the body of FIG. 31.
Figure 34:
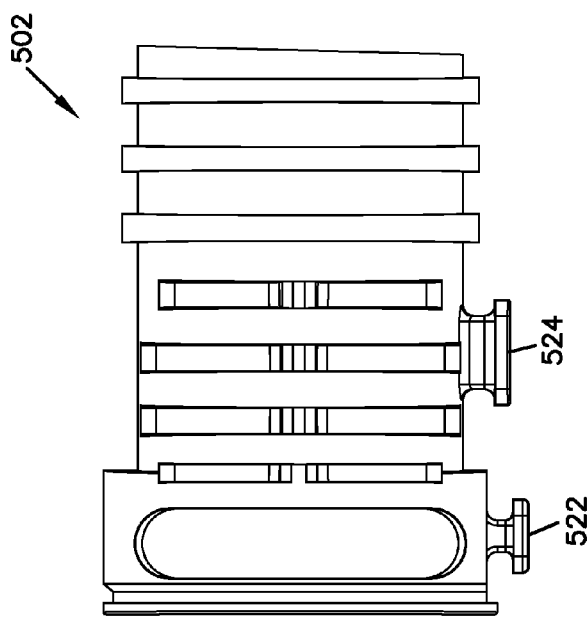
FIG. 34 shows a top view of the body of FIG. 31.
Figure 33:
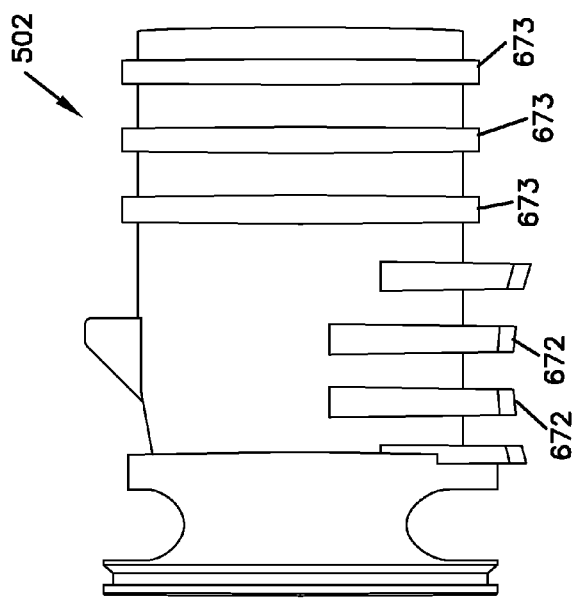
FIG. 33 shows a side view of the body of FIG. 31.
Figure 35:
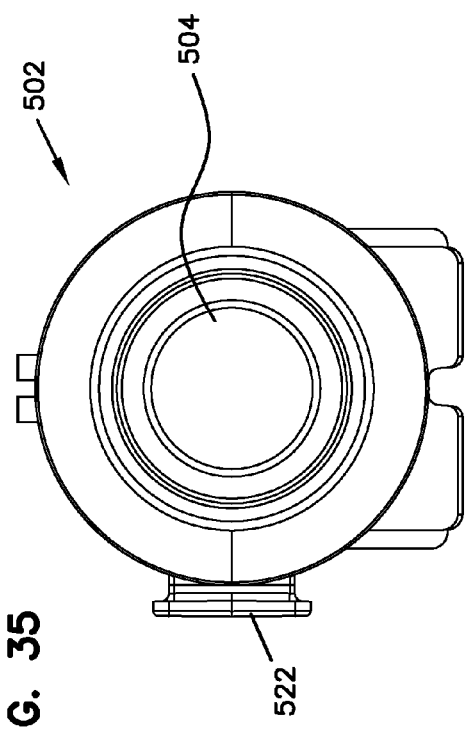
FIG. 35 shows an end view of the body of FIG. 31.

A body 502 of the coupler 520 is shown in FIGS. 31-36. The body 502 includes first and second protrusions 522, 524 extending from the body 502. As shown in FIG. 27, the first and second protrusions 522, 524 extend into a flange member 602 of a base 660 of the coupler 510. The protrusions 522, 524 allow the second shot forming the base 660 to surround the protrusions 522, 524 to hold the base 660 (second shot) to the body 502 (first shot). This resists the peeling away of the base 660 from the body 502 during torquing of the coupler 510.

In addition, the body 502 includes extensions 672 formed on the body 502. These extensions 672 also allow the base 660 to be coupled more readily to the body 502. For example, the extensions 672 lock the body 502 into the base 660 and resist axial load that could be imparted if the coupling insert is pulled away from the body 502 without the latch being depressed. In addition, the extensions 672 add compressive strength to the body 502. The extensions 672, as well as three concentric rings 673, resist crushing/becoming out-of-round in a pack, either from contents or the user rolling over onto the pack. Finally, the extensions 672 and rings 673 also reduce the amount of material needed to form the base 660 (since the extensions 672 and rings 673 take up space that would otherwise be occupied by the base 660).

As shown in FIGS. 31-36, the body 502 in this embodiment lacks a shroud. Instead, the body 502 terminates at an end 682 within the base 660, as shown in FIG. 27.

Figure 36:
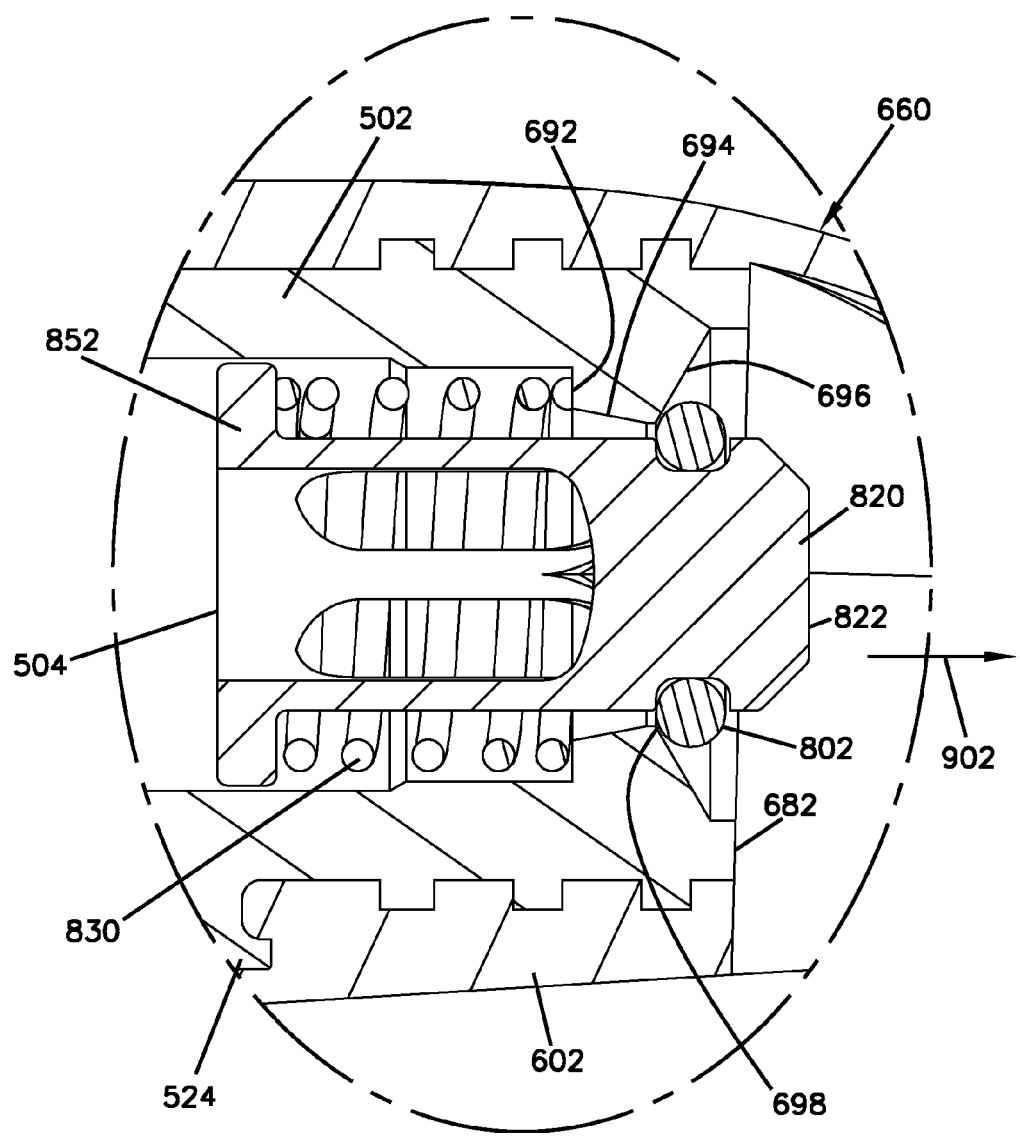
FIG. 36 shows an enlarged view of a portion of the coupler of FIG. 27.

As shown in FIGS. 27 and 36, a valve member 820 is positioned within the body 502 and is biased into a forward position by a spring 830. In this example, the spring 830 is positioned between an area 692 formed by the body 502, and a lip 852 formed by the valve member 820.

In the closed position shown in FIG. 36, the valve member 820 is held within the body 502 by a seal member 802 (e.g., O-ring) engaging a sealing surface 696 formed by the body 502. When pushed against the spring 830 in a direction 902 into an open position (e.g., by a mating coupler, not shown), the seal member 802 disengages the sealing surface 696 to allow fluid to flow therethrough.

In this example, the valve member 820 is positioned within the body 502 through a front opening 504 of the body 502. During assembly, the seal member 8002 is positioned on the valve member 820, and the spring 830 is inserted around the valve member 820. A diameter of the spring 830 is such that the valve member 820, with the seal member 802, can be positioned within the spring 830.

In this configuration, the valve member 820, with the seal member 802 and the spring 830, is inserted into the front opening 504 of the body 502 in the direction 902. The valve member 820 is moved in the direction 902 until the spring 830 engages the area 692 formed by the body 502.

The valve member 820 is continued to be pushed in the direction 902 until the seal member 802 engages a slanted surface 694 of the body 502. This slanted surface 694 allows the seal member 802 to be compressed and continued to be moved backward within the body 502 in the direction 902 until the seal member 802 clears a point 698 at the end of the slanted surface 694. At this position, the valve member 820 can be released, and the spring 830 forces the valve member 820 towards the front of the body 502 until the seal member 802 engages the sealing surface 696, thereby retaining the valve member 820 within the body 502.

In example embodiments, the bladder including the coupler is used for hydration purposes. However, the techniques described herein could be used for other purposes. For example, the coupler could also be applied to other bladders used for other purposes, such as a sleep surface like a mattress for a water or air bed. In yet other examples, the couplers could be applied to bladders holding other types of fluids for dispensing. For example, the bladders could be used to dispense fluids for cleaning or fluids for pest or weed control. Other configurations are possible.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fluid-tight system, comprising:
   a bladder defining an interior space sized to receive a fluid; and
   a coupler, including:
   a coupling device made of an inflexible polymeric material, the coupling device including a body defining a fluid passage therethrough that is connected to an aperture sized to receive a mating coupling device, the coupling device including a latch configured to move in a direction generally transverse to a longitudinal axis of the body and tangential to the bladder between an uncoupled state and a coupled state to couple the mating coupling device thereto, and a valve member positioned in the fluid passage to move along the longitudinal axis of the coupling device between a closed position and an open position; and
   a base made of a flexible polymeric material, the base including a flange member sized to be coupled to the bladder, and the base including a receiving member sized to receive at least a portion of the coupling device and a cavity in fluid communication with the fluid passage of the coupling device and the interior space formed by the bladder;
   wherein the base is coupled to the coupling device by an overmold to form the coupler, the base and the coupling device forming an integral structure, and the coupler being fluid-tight;
   wherein the body is positioned at an angle relative to the base, the angle being formed between the base and the longitudinal axis of the body, and the angle being greater than zero; and
   wherein, when the valve member is moved into the open position, an end of the valve member extends out of the coupling device and is exposed into the cavity of the base member.

2. The system of claim 1, further comprising a shroud member extending from the coupling device.

3. The system of claim 1, further comprising one or more protrusions extending from the coupling device to engage the base.

4. The system of claim 1, wherein the flange member of the base defines a flat surface that is coupled to the bladder of the fluid hydration system.

5. The system of claim 1, wherein the valve member includes a seal member that seals against a surface of the coupling device.

6. The system of claim 5, wherein the valve member is inserted into a front opening of the coupling device during assembly of the coupler.

7. The system of claim 1, wherein the angle is 8 to 12 degrees.

8. The system of claim 1, wherein the angle is approximately 3 degrees.

* * * * *